United States Patent
Hasuo et al.

(10) Patent No.: US 7,242,865 B2
(45) Date of Patent: Jul. 10, 2007

(54) OPTICAL COMMUNICATION SYSTEM

(75) Inventors: Koji Hasuo, Kawasaki (JP); Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

(21) Appl. No.: 10/859,451

(22) Filed: Jun. 3, 2004

(65) Prior Publication Data

US 2004/0247312 A1 Dec. 9, 2004

Related U.S. Application Data

(63) Continuation of application No. PCT/JP01/10557, filed on Dec. 3, 2001.

(51) Int. Cl.
*H04B 10/00* (2006.01)
*H04B 10/08* (2006.01)
*H04B 10/04* (2006.01)
*H04J 14/02* (2006.01)

(52) U.S. Cl. .............. 398/37; 398/5; 398/94; 398/197

(58) Field of Classification Search ......... 398/5–7, 398/37, 94, 195, 197
See application file for complete search history.

(56) References Cited

U.S. PATENT DOCUMENTS 5,790,289 A    8/1998    Taga et al.
5,883,735 A *  3/1999    Sugiyama et al. ..... 359/341.42
6,160,648 A * 12/2000    Oberg et al. .............. 398/4

FOREIGN PATENT DOCUMENTS

| EP | 1 011 221 A2 | 6/2000 |
|----|---|---|
| EP | 1 076 434 A2 | 2/2001 |
| JP | 2-253730 | 10/1990 |
| JP | 8-321824 | 12/1996 |
| JP | 9-233023 | 9/1997 |
| JP | 11-088270 | 3/1999 |
| JP | 11-313349 | 11/1999 |
| JP | 2000-183818 | 6/2000 |
| JP | 2001-53686 | 2/2001 |

* cited by examiner

*Primary Examiner*—Dalzid Singh
(74) *Attorney, Agent, or Firm*—Staas & Halsey LLP

(57) ABSTRACT

An optical transmission equipment in an optical communication system interconnecting two optical transmission equipment sets by a main transmission line and a backup transmission line. An optical amplifier amplifies and outputs optical signals from one transmission line in use, interconnecting the optical transmission equipment concerned with neighboring upstream optical transmission equipment, and outputs the optical signals including a signal component and a noise component. A controller controls an optical signal level so that a signal component in the optical signal reaches a predetermined level. The controller corrects the optical signal level when the transmission line transmitting the optical signal is switched either from the main transmission line to the backup transmission line or from the backup transmission line to the main transmission line, either between the optical transmission equipment concerned and a neighboring upstream optical transmission equipment, or between other two optical transmission equipment sets located on an upstream side.

12 Claims, 17 Drawing Sheets

FIG. 4

| DCC | OW | Number of wavelengths information | ASE correction information | SW state | Control byte |
|---|---|---|---|---|---|

| Pre-emphasis information | Pre-emphasis information | . . . | Pre-emphasis information |
|---|---|---|---|

FIG. 11

| Terminal station 1₁ | Relay station 2₁ | ASE correction factor |
|---|---|---|
| OSW21 | OSW32 | |
| 0 | 0 | $\eta 10$ |
| 1 | 1 | $\eta 11$ |

FIG. 12A

| Terminal station 1₁ | Relay station 2₁ | Relay station 2₂ | ASE correction factor |
|---|---|---|---|
| OSW21 | OSW32 | OSW41 | OSW32 | |
| 0 | 0 | 0 | 0 | $\eta 20$ |
| 0 | 0 | 1 | 1 | $\eta 21$ |
| 1 | 1 | 0 | 0 | $\eta 22$ |
| 1 | 1 | 1 | 1 | $\eta 23$ |

FIG. 12B

| Relay station 2₁ | Relay station 2₂ | ASE correction factor |
|---|---|---|
| OSW41 | OSW32 | |
| 0 | 0 | $\eta 24$ |
| 1 | 1 | $\eta 25$ |

FIG. 13A

| Terminal station $1_1$ | Relay station $2_1$ | | Relay station $2_2$ | | Terminal station $1_2$ | ASE correction factor |
|---|---|---|---|---|---|---|
| OSW21 | OSW32 | OSW41 | OSW32 | OSW41 | OSW22 | |
| 0 | 0 | 0 | 0 | 0 | 0 | $\eta 30$ |
| 0 | 0 | 0 | 0 | 1 | 1 | $\eta 31$ |
| 0 | 0 | 1 | 1 | 0 | 0 | $\eta 32$ |
| 0 | 0 | 1 | 1 | 1 | 1 | $\eta 33$ |
| 1 | 1 | 0 | 0 | 0 | 0 | $\eta 34$ |
| 1 | 1 | 0 | 0 | 1 | 1 | $\eta 35$ |
| 1 | 1 | 1 | 1 | 0 | 0 | $\eta 36$ |
| 1 | 1 | 1 | 1 | 1 | 1 | $\eta 37$ |

FIG. 13B

| Relay station $2_1$ | Relay station $2_2$ | | Terminal station $1_2$ | ASE correction factor |
|---|---|---|---|---|
| OSW41 | OSW32 | OSW41 | OSW22 | |
| 0 | 0 | 0 | 0 | $\eta 38$ |
| 0 | 0 | 1 | 1 | $\eta 39$ |
| 1 | 1 | 0 | 0 | $\eta 40$ |
| 1 | 1 | 1 | 1 | $\eta 41$ |

FIG. 13C

| Relay station $2_2$ | Terminal station $1_2$ | ASE correction factor |
|---|---|---|
| OSW41 | OSW22 | |
| 0 | 0 | $\eta 42$ |
| 1 | 1 | $\eta 43$ |

FIG. 16

Attenuation factor table

| Terminal station $1_1$ | Relay station $2_1$ | | Relay station $2_2$ | | Terminal station $1_1$ | Attenuation factor of VAT$10_1$~$10_m$ | | |
|---|---|---|---|---|---|---|---|---|
| OSW21 | OSW32 | OSW41 | OSW32 | OSW41 | OSW21 | $\alpha 11$ | ... | $\alpha m1$ |
| 0 | 0 | 0 | 0 | 0 | 0 | $\alpha 11$ | ... | $\alpha m1$ |
| 1 | 0 | 0 | 0 | 1 | 1 | $\alpha 12$ | ... | $\alpha m2$ |
| 0 | 0 | 1 | 1 | 0 | 0 | $\alpha 13$ | ... | $\alpha m3$ |
| 1 | 0 | 1 | 1 | 1 | 1 | $\alpha 14$ | ... | $\alpha m4$ |
| 0 | 1 | 0 | 0 | 0 | 0 | $\alpha 15$ | ... | $\alpha m5$ |
| 1 | 1 | 0 | 0 | 1 | 1 | $\alpha 16$ | ... | $\alpha m6$ |
| 0 | 1 | 1 | 1 | 0 | 0 | $\alpha 17$ | ... | $\alpha m7$ |
| 1 | 1 | 1 | 1 | 1 | 1 | $\alpha 18$ | ... | $\alpha m8$ |

OPTICAL COMMUNICATION SYSTEM

This application is a contiunuation of PCT/JP01/10557 filed Dec. 3, 2001.

FIELD OF THE INVENTION

The present invention relates to an optical communication system and optical transmission equipment therefor, and more particularly an optical communication system having plural sets of optical transmission equipment, of which the neighboring two sets are connected with the main transmission line and the backup transmission line, and an optical signal is transmitted on either one of the transmission lines, and optical transmission equipment therefor.

BACKGROUND OF THE INVENTION

In a single-wavelength optical transmission system transmitting data with single wavelength light, there has been put into actual use a system having duplicated (redundant) transmission lines, i.e. the main transmission line and the backup transmission line, for a station apparatus of a single (non-duplicated) configuration, thereby providing fault tolerance ability to the transmission line. Provision of fault tolerance ability with multiple configuration for each station apparatus may be considered, but this is not adopted practically because cost increases.

FIG. 18 is a block diagram illustrating an overview of the single-wavelength optical transmission system having duplicated transmission lines. In this single-wavelength optical transmission system, terminal stations 101, 103, and a relay station 102 are provided as station apparatuses. In some cases, more than two relay stations, instead of one, may be configured in the system.

The transmission lines provided between the neighboring station apparatuses are duplicated. Between each station apparatus, main transmission lines F01, F02, R01 and R02 and backup transmission lines F11, F12, R11 and R12, which are made of light fiber, are provided. The main transmission lines are used normally, while the backup transmission lines are used when a failure (for example, fiber break and deterioration, etc. caused by secular change, etc.) occurs on the main transmission line.

Each station apparatus includes optical amplifiers (AMP. For example, Erbium-doped fiber amplifiers: EDFA) 201–206, so as to amplify input optical signals. Further, each station apparatus includes optical switches (OSW) 301–308 for transmitting input optical signals to either the main transmission line or the backup transmission line. The optical switches also receive the optical signals from either the main transmission line or the backup transmission line. Since a section between the stations is termed as span, in some cases, optical switches 301–308 may be termed as span switches.

These optical switches are switched to the main transmission line side when there is no failure (normal state). In the event that a failure occurs in the main transmission line, the corresponding optical switches are switched over to the backup transmission line side. For example, in the normal state, optical switch 301 is in the state switched to the main transmission line F01 side, and thereby an optical signal input from optical amplifier 201 is output to the main transmission line F01 side. In the event that a failure occurs in the main transmission line F01, optical switch 301 is switched over to the backup transmission line F11 side, and the optical signal from optical amplifier 201 is output to the backup transmission line F11.

Meanwhile, as a communication system enabling high-speed transmission of a large amount of data, a wavelength division multiplex (WDM) optical communication system has received wide attention. This WDM optical communication system multiplexes optical signals into different wavelength signals, which transmits on one optical fiber.

In such a WDM optical communication system, implementation of a fault tolerant system is also desired. Similar to the single-wavelength optical communication system shown in FIG. 18, a system has been put into practical use, such that optical fiber transmission lines between the station apparatuses have duplicated (redundant) configurations, consisting of the main transmission line and the backup transmission line, in contrast to the station apparatuses having single (non-duplicated) configurations, and that these transmission lines are switched by the optical switches.

However, most of the conventional WDM optical communication systems have the same number of optical switches as the number of multiplexed wavelengths, and each optical switch switches the optical signal on a wavelength-by-wavelength basis. Accordingly, in the conventional WDM optical communication system, with the increase of the number of the multiplexed wavelengths (for example, 160 waves, 320 waves, etc.), the cost has become increased because the provision of the optical switches with the same number as the number of the wavelengths is necessary.

Accordingly, there has been desired the WDM optical communication system in which the WDM multiplexed optical signals are switched collectively by a single optical switch.

However, in order to put into actual use such a WDM optical communication system using an optical switch for collectively switching optical signals, there are some problems to be solved, differently from the optical communication system using the conventional optical switch switching the optical signals on a wavelength-by-wavelength basis.

The first problem is how to compensate a transmission loss difference caused by the transmission line (optical switch) switchover.

When the transmission line is switched over from the main transmission line to the backup transmission line as a result of the switchover of the optical switch, an attenuation factor (loss) of the transmission line is varied, producing a varied signal level to be input to an optical amplifier in the succeeding stage. When the input signal level is varied, the level of amplified spontaneous emission (ASE) light (noise component) generated from the optical amplifier also varies. This produces an undesirable increase of possibility that the further succeeding optical amplifier becomes unable to amplify the signal component (communication signal component) included in the input signal to a predetermined level.

In order to solve such a problem, conventionally, variable optical attenuators have been provided on both, or either of, the main transmission line and the backup transmission line. By adjusting the attenuation factor of any variable optical attenuator, the optical signal level input from the main transmission line to the optical amplifier can be set substantially equal to the optical signal level input from the backup transmission line to the optical amplifier.

This method, however, has limit to cope with a variety of network structures. For example, this method is not applicable when the lengths of the main transmission line and the backup transmission line largely differ, resulting in that the difference of the attenuation factors between both transmission lines exceeds beyond an adjustable range of the variable optical attenuator. For this reason, it becomes necessary to introduce another method, so that each optical amplifier can amplify each signal component to a predetermined level without adjusting the attenuation factor.

The second problem is how to prevent a receiving quality deterioration of the optical signal caused by the transmission line (optical switch) switchover.

In some cases, an aspect of tilt produced in the optical signal is varied when a wavelength dependent loss (WDL) of the transmission line or the flatness in the gain of the intervened optical amplifier is varied after the switchover of the transmission line from the main transmission line to the backup transmission line, or vice versa, by use of the optical switches. This may produce an error in a particular wavelength signal at a receiving end, because of non-uniformity of the signal quality being produced among the respective wavelengths.

To cope with this problem, it is necessary to prevent the signal quality of each wavelength from deterioration even when the switchover is performed, by compensating the difference in the tilt.

The third problem is how to prevent generation of a light surge.

The light surge is generated by a burst emission of the energy accumulated in the optical amplifier (such as EDFA) during a light interception period of no optical signal input into the optical amplifier, when the optical signal input is resumed after the light interception.

In the WDM optical communication system, the light interception is produced when an optical signal is intercepted in the optical switch during the switchover time (for example, ten and a few milliseconds), and accordingly no optical signal is input to the amplifier. Also, the light surge is generated when the optical signal is input again to the optical amplifier through the optical switch, after the switchover completion of the optical switch.

Especially in the WDM optical communication system, since the optical signals are multiplexed, output power (output electric power and output level) from the optical amplifier becomes larger, in proportion as the increased number of wavelengths. Because the light surge is superposed onto this output level, the resultant output level becomes remarkably high, which may cause damage, such as melting of the optical fiber transmission line.

To prevent generation of such a light surge, one method may be considered so as to adjust the light interception period to a time sufficient for emitting the residual energy accumulated in the optical amplifier. However, this method is not preferable because a longer signal interception period than a tolerable time is produced by the switchover of the optical switch longer.

Accordingly, a method for preventing generation of the light surge, enabling the light interception period within the tolerable signal interception period, is required.

SUMMARY OF THE INVENTION

It is an object of the present invention to compensate differences of transmission line losses resulting from a transmission line switchover.

It is another object of the present invention to prevent deterioration of receiving quality of an optical signal resulting from the transmission line switchover.

It is still another object of the present invention to prevent generation of a light surge caused by the transmission line switchover.

The first aspect of the present invention of the optical transmission equipment in the optical communication system which has plural optical transmission equipments connected with their neighboring optical transmission equipments through main and backup transmission lines on either of which optical signals transmit, is characterized by, having optical amplifiers in optical transmission equipments amplifying optical signal inputs from one transmission line in use for optical signal transmission out of the main transmission line and the backup transmission line interconnecting the optical transmission equipment concerned with neighboring upstream optical transmission equipment, and having controllers in optical transmission equipments controlling optical signal levels of output from the optical amplifier so that the signal component included in the optical signal output from the optical amplifier reaches a predetermined level and correcting the optical signal level of output from the optical amplifier when the transmission line transmitting the optical signal is switched either from the main transmission line to the backup transmission line or from the backup transmission line to the main transmission line, either between the optical transmission equipment concerned and the neighboring upstream optical transmission equipment, or between other two optical transmission equipment sets located on the upstream side.

The first aspect of the present invention of the optical communication system is characterized by, having one sending terminal station and one or more relay stations and one receiving terminal station, transmitting optical signals from the sending terminal station to the receiving terminal station through the relay stations, having the sending terminal station which sends optical signals to one of the relay stations through one of the main transmission line or the backup transmission line being connected to the neighboring downstream relay station, having relay stations which include an optical amplifier amplifying the optical signal input from one transmission line in use for optical signal transmission out of the main transmission line and the backup transmission line connected to the neighboring sending terminal station or another neighboring upstream relay station outputting optical signals including the signal component and the noise component and include a controller controlling the optical signal level of output from the optical amplifier so that the signal component included in the optical signal output from the optical amplifier reaches a predetermined level, and having the receiving terminal station which includes an optical amplifier amplifying the optical signal input from one transmission line in use for optical signal transmission out of the main transmission line and the backup transmission line connected to the neighboring sending terminal station or the other relay station located on the upstream side and outputting an optical signal including a signal component and a noise component; a controller in controlling the optical signal level output from the optical amplifier so that the signal component included in the optical signal output from the optical amplifier reaches a predetermined level. Each controller provided in a relay station and a receiving terminal station corrects the optical signal level of output from each own optical amplifier when the transmission line transmitting the optical signal is switched either from the main transmission line to the backup transmission line or from the backup transmission line to the main transmission line, either between the optical transmission equipment concerned and the neighboring upstream optical transmission equipment, or between other two optical transmission equipment sets located on the upstream side.

The first aspect of the present invention provides ability to compensate transmission loss differences produced by the transmission line switchover by correcting the optical signal level.

In the preferred embodiment of the present invention, the controller performs the correction based on the first noise component included in the optical signal being input to the optical amplifier and the second noise component generated by the optical amplifier concerned.

Further, in another preferred embodiment, the controller retains in advance the correction data for performing the correction, and performs the correction based on the retained correction data.

The second aspect of the present invention of optical transmission equipment of an optical communication system having plural sets of optical transmission equipment of which each neighboring optical transmission equipment set is interconnected with the main transmission line and the backup transmission line, is characterized by; an optical amplifier amplifying optical signal inputs from one transmission line in use for optical signal transmission out of the main transmission line and the backup transmission line interconnecting the optical transmission equipment concerned with neighboring upstream optical transmission equipment, and outputting an optical signal including the signal component and the noise component, a controller controlling optical signal levels of outputs from the optical amplifier so that the signal component included in the optical signal output from the optical amplifier reaches a predetermined level, and a transmitter transmitting correction data for correcting output levels of optical amplifiers in the neighboring upstream optical transmission equipment to the neighboring upstream optical transmission equipment.

The second aspect of the optical transmission equipment of the optical communication system having plural sets of optical transmission equipment of which each neighboring optical transmission equipment set is interconnected by the main transmission line and the backup transmission line, is characterized by; an optical amplifier amplifying input optical signals and outputting optical signals after the amplification to the neighboring downstream optical transmission equipment through one of the main transmission line and the backup transmission line being connected to both the optical transmission equipment concerned and the neighboring downstream optical transmission equipment, and a controller controlling optical signal levels of output from the optical amplifier so that the signal component included in the optical signal output from the optical amplifier reaches a predetermined level. When the transmission line outputting the optical signal is switched either from the main transmission line to the backup transmission line or from the backup transmission line to the main transmission line, the controller corrects the optical signal level output from the optical amplifier based on the correction data transmitted from the neighboring downstream optical transmission equipment.

The second aspect of the present invention also provides ability to compensate transmission loss difference produced by the transmission line switchover by correcting the optical signal level.

The third aspect of the present invention of the optical communication system having a sending unit sending optical signals multiplexed with wavelength division multiplexing to a receiving unit through either one of the main transmission line or the backup transmission line, and a receiving unit receiving the optical signal transmitted from the sending unit from either one of the main transmission line or the backup transmission line, is characterized by; the sending unit which includes a pre-emphasis section adjusting each wavelength signal level and a transmitter multiplexing each wavelength signal of which level is adjusted by the pre-emphasis section and transmitting the multiplexed wavelength signal, and a controller controlling the pre-emphasis section to adjust each wavelength signal level, based on control data transmitted from the receiving unit for adjusting each wavelength signal level; and the receiving unit includes a measurement section measuring signal quality of each wavelength included in the received optical signal, a memory storing an initial value of the signal quality of each wave length measured by the measurement section before the transmission line is switched over either from the main transmission line to the backup transmission line or from the backup transmission line to the main transmission line, and a transmitter causing the measurement section to measure signal quality of each wavelength included in the optical signal received after the switchover when the transmission line switchover is performed, and generating control data based on both the initial quality value and the post-switchover quality value, and transmitting the generated control data to the sending unit.

The third aspect of the present invention of the sending unit transmitting optical signals multiplexed with wavelength division multiplexing to a receiving unit through either one of the main transmission line or the backup transmission line, is characterized by; the sending unit which includes a pre-emphasis section adjusting each wavelength signal level, a transmitter multiplexing each wavelength signal of which level is adjusted by the pre-emphasis section and transmitting the multiplexed wavelength signal, and a controller controlling the pre-emphasis section to adjust each wavelength signal level, based on control data transmitted from the receiving unit for adjusting each wavelength signal level.

The third aspect of the present invention of the receiving unit receiving a multiplexed optical signal transmitted from a sending unit through the main transmission line or the backup transmission line from either one of the main transmission line or the backup transmission line, is characterized by; a measurement section measuring the signal quality of each wavelength included in the received optical signal, a memory storing an initial value of the signal quality of each wavelength measured by the measurement section before the transmission line is switched over either from the main transmission line to the backup transmission line or from the backup transmission line to the main transmission line, and a transmitter ordering the measurement section to measure the signal quality of each wavelength included in the optical signal received after the switchover when the transmission line switchover is performed, and transmitting to the sending unit control data by which the sending unit controls a transmission level of each wavelength, based on both the initial quality value and the post-switchover quality value.

The third aspect of the present invention provides ability to avoid deterioration of the reception quality of the optical signal caused by the transmission line switchover by readjustment after the switchover.

The fourth aspect of the present invention of the sending unit sending optical signals multiplexed with wavelength division multiplexing, to a receiving unit through either one of the main transmission line or the backup transmission line, is characterized by; a pre-emphasis section adjusting each wavelength signal level, a transmitter multiplexing each wavelength signal of which level is adjusted by the pre-emphasis section and transmitting the multiplexed wavelength signal, a memory storing control data which includes adjustment amount of the pre-emphasis section correspondingly to combinations of the transmission line states indicating which of the main transmission line and the backup transmission line is in use for the optical signal transmission with respect to the transmission lines located between the sending unit and the receiving unit, and a controller controlling the pre-emphasis section to adjust each wavelength signal level, based on the transmission line states and the control data.

The fourth aspect of the present invention also provides ability to avoid deterioration of the reception quality of the optical signal caused by the transmission line switchover by readjustment after the switchover.

The fifth aspect of the present invention is characterized by an optical switch unit which includes an optical switch switching to one side of the two transmission lines, and thereby an optical signal is input from the switched transmission line, and a dummy light output section outputting dummy lights on detection of the light output from the optical switch being intercepted.

The fifth aspect of the present invention provides ability to prevent generation of light surge caused by the transmission line switchover by sending dummy lights.

Further scopes and features of the present invention will become more apparent by the following description of the embodiments with the accompanied drawings.

BRIEF DESCRIPTION OF THE DRAWINGS

FIG. 4 shows an exemplary OSC structure.

FIGS. 11, 12A, 12B show examples of an ASE correction table of a relay station.

FIGS. 13A to 13C show examples of an ASE correction table of a terminal station.

FIG. 16 shows an example of an attenuation factor table.

DETAILED DESCRIPTION OF THE PREFERRED EMBODIMENTS

The preferred embodiment of the present invention is described hereinafter referring to the charts and drawings. However, it is to be noted that the scope of the present invention is not limited to the embodiments described below, but instead embraces all equivalents to the claims described.

<Configuration of WDM Optical Communication System>

Figure 1:
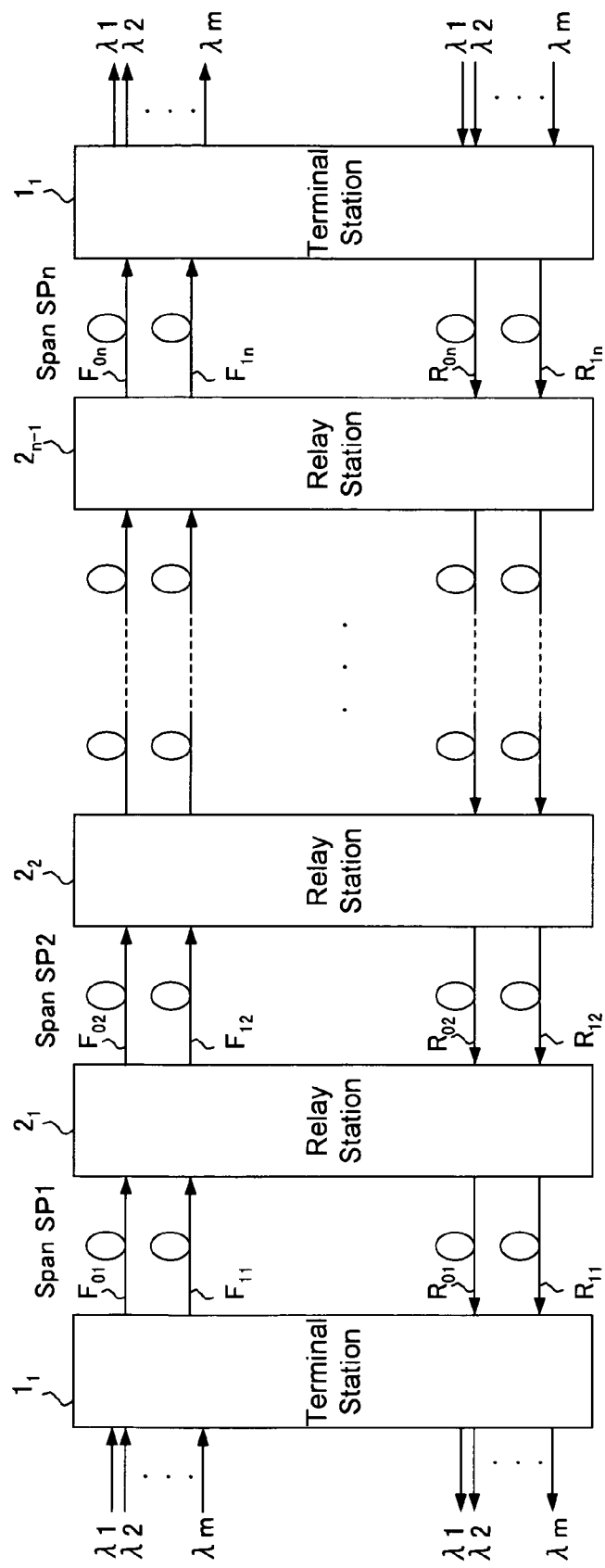
FIG. 1 shows a block diagram illustrating an overall configuration of a wavelength division multiplex (WDM) optical communication system according to one embodiment of the present invention.

FIG. 1 shows a block diagram illustrating an overall configuration of a wavelength division multiplex (WDM) optical communication system according to one embodiment of the present invention. In this WDM optical communication system, terminal stations $1_1$, $1_2$, and one or more relay stations $2_1$–$2_{n-1}$ (n is an integer more than 2) are provided as optical transmission equipment. Further, as optical transmission lines, this WDM optical communication system includes transmission lines $F_{01}$–$F_{0n}$, $F_{11}$–$F_{1n}$, $R_{01}$–$R_{0n}$, and $R_{11}$–$R_{1n}$, constituted of optical fibers.

Sections between neighboring stations among terminal stations $1_1$, $1_2$, and relay stations $2_1$–$2_{n-1}$ are termed as 'spans'. In the WDM optical communication system shown in FIG. 1, (n) spans SP1–SPn are formed. In these spans SP1–SPn, the transmission lines $F_{01}$–$F_{0n}$, $F_{11}$–$F_{1n}$, $R_{01}$–$R_{0n}$, and $R_{11}$–$R_{1n}$, are provided for interconnecting neighboring stations.

Each terminal station $1_1$, $1_2$ is commonly used as terminal station on the transmission side (hereafter simply referred to as sending terminal station), and terminal station on the reception side (hereafter simply referred to as receiving terminal station). Each relay station $2_1$–$2_{n-1}$ amplifies an optical signal (WDM optical signal) transmitted and received between both terminal stations $1_1$, $1_2$, and relays the optical signal.

The transmission lines $F_{01}$–$F_{0n}$ (hereafter referred to as 'transmission line F0') and $F_{11}$–$F_{1n}$ (hereafter referred to as 'transmission line F1') are used when an optical signal transmitted from terminal station $1_1$ (sending terminal station) is transmitted to terminal station $1_2$ (receiving terminal station) through relay stations $2_1$–$2_{n-1}$. Among these transmission lines, the transmission line F0 is the main transmission line (line in use, in-use system, #0 system, or Main), and the transmission line F1 is the backup transmission line (standby line, standby system, #1 system, or Backup) for use when a failure (line break, deterioration resulting from a secular change, increased noise, etc.) occurs on any main line.

The transmission lines $R_{01}$–$R_{0n}$ (hereafter referred to as 'transmission line R0') and $R_{11}$–$R_{1n}$ (hereafter referred to as 'transmission line R1') are used when WDM optical signals transmitted from terminal station $1_2$ is transmitted to terminal station $1_1$ through relay stations $2_{n-1}$–$2_1$. Among these transmission lines, the transmission line R0 is the main transmission line, and the transmission line R1 is the backup transmission line for use when a malfunction occurs on any main line.

Hereafter, a direction from terminal station $1_1$ to terminal station $1_2$ is termed as forward direction, and the other direction from terminal station $1_2$ to terminal station $1_1$ is termed as reverse direction. Further, when terminal stations $1_1$, $1_2$ are generically referred to, they are briefly denoted as 'terminal station 1' and also when relay stations $2_1$–$2_{n-1}$ are generically referred to, they are briefly denoted as 'relay station 2'. Moreover, terminal station 1 and relay station 2 may generically be referred to as 'station'.

Additionally, the optical fiber includes single mode fiber (SMF), zero dispersion shift fiber (DSF), non-zero dispersion shift fiber (NZDSF), dispersion compensation fiber (DCF), etc.

Figure 2:
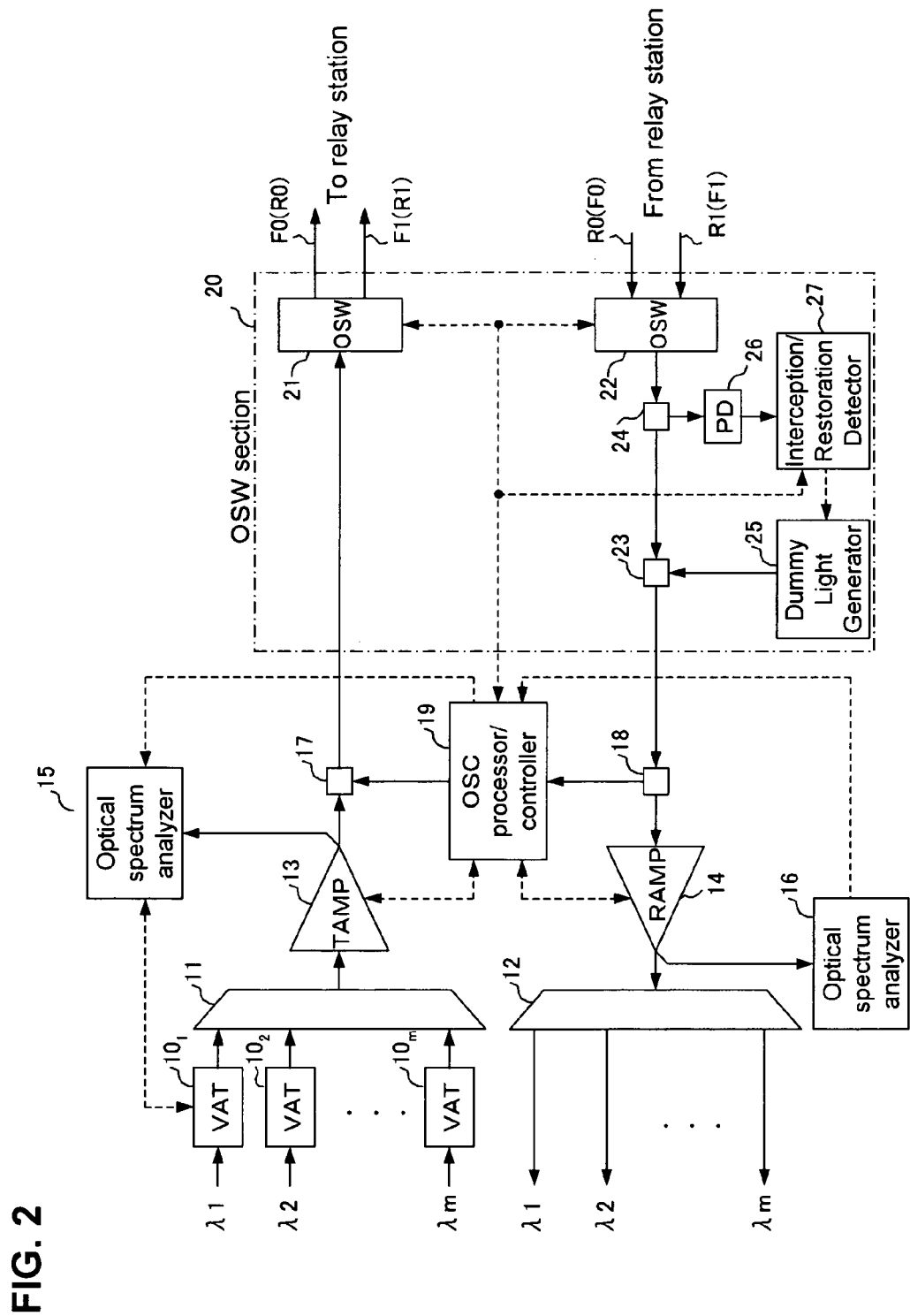
FIG. 2 shows a block diagram illustrating a detailed configuration of a terminal station.

FIG. 2 shows a block diagram illustrating a detailed configuration of terminal station $1_1$. Hereafter, the configuration of terminal station $1_1$ is described. However, since terminal station $1_2$ is structured of the same configuration, the following description is also applicable to terminal station $1_2$.

Terminal station $1_1$ includes variable optical attenuators (VAT) $10_1$–$10_m$, optical multiplexer $1_1$, optical demultiplexer $1_2$, optical amplifier for transmission (TAMP) 13, optical amplifier for reception (RAMP) 14, WDM filters 17, 18, optical spectrum analyzers 15, 16, OSC processor/controller 19 (OSC: optical supervisory channel), and OSW section 20 (OSW: optical switch).

Further, OSW section 20 includes optical switches (span switches) 21, 22, WDM filters 23, 24, a dummy light generator 25, a photo diode (PD) 26, and an interception/restoration detector 27.

The number (m) of VAT $10_1$–$10_m$ is an integer more than 2, which represents the number of wavelengths (i.e. the number of channels) of the WDM-multiplexed communication signals. For example, m is 80, 160, 176, etc.

Optical signals having wavelengths λ1–λm of communication signals are respectively input to VAT $10_1$–$10_m$. The optical signals of wavelengths λ1–λm are allocated in a wavelength band having wavelengths of 1,528 nm–1,568 nm, which is termed as C band (conventional band). VAT $10_1$–$10_m$ attenuate or amplify the input optical signals according to the attenuation amount controlled by spectrum analyzer 15, and supply the attenuated optical signals, or the amplified optical signals, to optical multiplexer 11. This attenuation or amplification performed by VAT $10_1$–$10_m$ in regard to the optical signals of respective wavelengths is termed as pre-emphasis control, which will be described later in detail.

Optical multiplexer 11 is constituted of, for example, arrayed waveguide grating (AWG), fiber grating, WDM coupler, etc. This optical multiplexer 11 multiplexes the optical signals input through VAT $10_1$–$10_m$ into wavelengths λ1–λm by WDM, and supplies the optical signal after being multiplexed (hereafter referred to as 'WDM optical signal') to TAMP 13.

TAMP 13 has, for example, an Erbium-doped fiber amplifier (EDFA), or the like, for directly amplifying the optical signal, and an automatic control circuit for controlling the output power (output electric power and level). TAMP 13 amplifies the input WDM optical signals to optical signals having an output level to which ASE (amplified spontaneous emission) correction is performed, under the control of OSC processor/controller 19. The ASE correction will be described later in detail.

A substantial portion of the WDM optical signal amplified by TAMP 13 is supplied to OSW section 20 through WDM filter 17, and a portion of the residual WDM optical signal is supplied to optical spectrum analyzer 15.

Optical spectrum analyzer 15 measures signal intensity (electric power and power level) of each wavelength and an optical signal-to-noise ratio (OSNR), respectively included in the WDM optical signal supplied from TAMP 13, and adjusts an attenuation amount of each VAT $10_1$–$10_m$ under the control of OSC processor/controller 19.

OSC processor/controller 19 supplies WDM filter 17 with an OSC signal to be transmitted to the neighboring relay station $2_1$. Also, OSC processor/controller 19 receives from WDM filter 18 an OSC signal included in the WDM optical signal received from relay station $2_1$, and performs predetermined processing. A wavelength in the C band, different from the wavelengths λ1–λm, is allocated for the OSC signal, and the OSC signal itself is WDM multiplexed into the WDM optical signal being output from TAMP 13.

Further, OSC processor/controller 19 controls OSW section 20 (including OSW 21, 22 and interception/restoration detector 27), optical spectrum analyzer 15, TAMP 13, RAMP 14, etc. The detailed processing and control performed by OSC processor/controller 19 will be described later.

WDM filter 17 multiplexes the OSC signal supplied from OSC processor/controller 19 with the WDM optical signal supplied from TAMP 13, and supplies the multiplexed WDM optical signal to OSW 21 in OSW section 20.

By OSC processor/controller 19, OSW 21 is switched to one of the main transmission line F0 side (or transmission line R0 side in case of terminal station $1_2$) and the backup transmission line F1 side (transmission line R1 side in case of terminal station $1_2$). The WDM optical signal having a plurality of optical signal wavelengths being input from WDM filter 17 to OSW 21 is collectively output to the transmission line on the switched side, and is transmitted to relay station $2_1$ (relay station $2_{n-1}$ in case of terminal station $1_2$) through the transmission line on the switched side.

Meanwhile, OSW 22 in OSW section 20 is switched to one of the transmission line on which the WDM signal (communication signal and OSC signal) is incoming, out of the main transmission line R0 (F0) or the backup transmission line R1 (F1).

The WDM optical signal input to OSW 22 through one of the main transmission line R0 (F0) or the backup transmission line R1 (F1) from relay station $2_1$ ($2_{n-1}$) is input to WDM filter 18 through WDM filters 24, 23.

WDM filter 18 demultiplexes the input WDM optical signal to obtain the separate OSC signal, and supplies the separate OSC signal to OSC processor/controller 19, and supplies the residual communication signal (WDM optical signal) to RAMP 14.

RAMP 14 includes an EDFA, etc. and an automatic control circuit, similarly to TAMP 13, and thereby amplifies the input WDM optical signals to optical signals having ASE-corrected output power (level), under the control of OSC processor/controller 19. A substantial portion of the amplified WDM optical signal is supplied to optical demultiplexer 12, and a portion of the residual WDM optical signal is supplied to optical spectrum analyzer 16.

Optical spectrum analyzer 16 measures signal intensity (power) and an OSNR for each wavelength included in the WDM optical signal supplied from RAMP 14, under the control of OSC processor/controller 19. Optical spectrum analyzer 16 then supplies the measured signal intensity and OSNR to OSC processor/controller 19.

Optical demultiplexer 12 is constituted of, for example, arrayed waveguide grating (AWG), fiber grating, WDM coupler, etc., similarly to optical multiplexer 11. This optical demultiplexer 12 demultiplexes the input WDM signal into optical signals each having wavelength λ1–λm, and supplies the demultiplexed optical signal to non-illustrated equipment in the succeeding stage.

WDM filter 24 provided in OSW section 20 supplies a portion of the WDM optical signal input from OSW 22 to PD 26. PD 26 converts the input optical signal into an electric signal and supplies the converted electric signal to interception/restoration detector 27.

Interception/restoration detector 27 detects interception and restoration of the WDM optical signal, based on the electric signal supplied from PD 26. On detection of the interception, interception/restoration detector 27 supplies dummy light generator 25 with a signal instructing to output a light (dummy light). Meanwhile, on detection of the restoration, interception/restoration detector 27 supplies dummy light generator 25 with a signal instructing to halt the dummy light output.

Dummy light generator 25 outputs the dummy light under the control of interception/restoration detector 27. The dummy light is used as light to be transmitted in substitution for the WDM optical signal, in the event that the WDM optical signal is intercepted. This dummy light has a wavelength different from the wavelengths $\lambda 1$–$\lambda m$ of the WDM optical signal, and a predetermined power value. As the wavelength of the dummy light, for example, a shorter wavelength on or a longer wavelength in the C band is used. Preferably, the predetermined power is substantially the same as the power of the WDM optical signal. The dummy light output from dummy light generator 25 is input to RAMP 14 through WDM filters 23 and 18. The detailed transmission processing of this dummy light will be described later.

Figure 3:
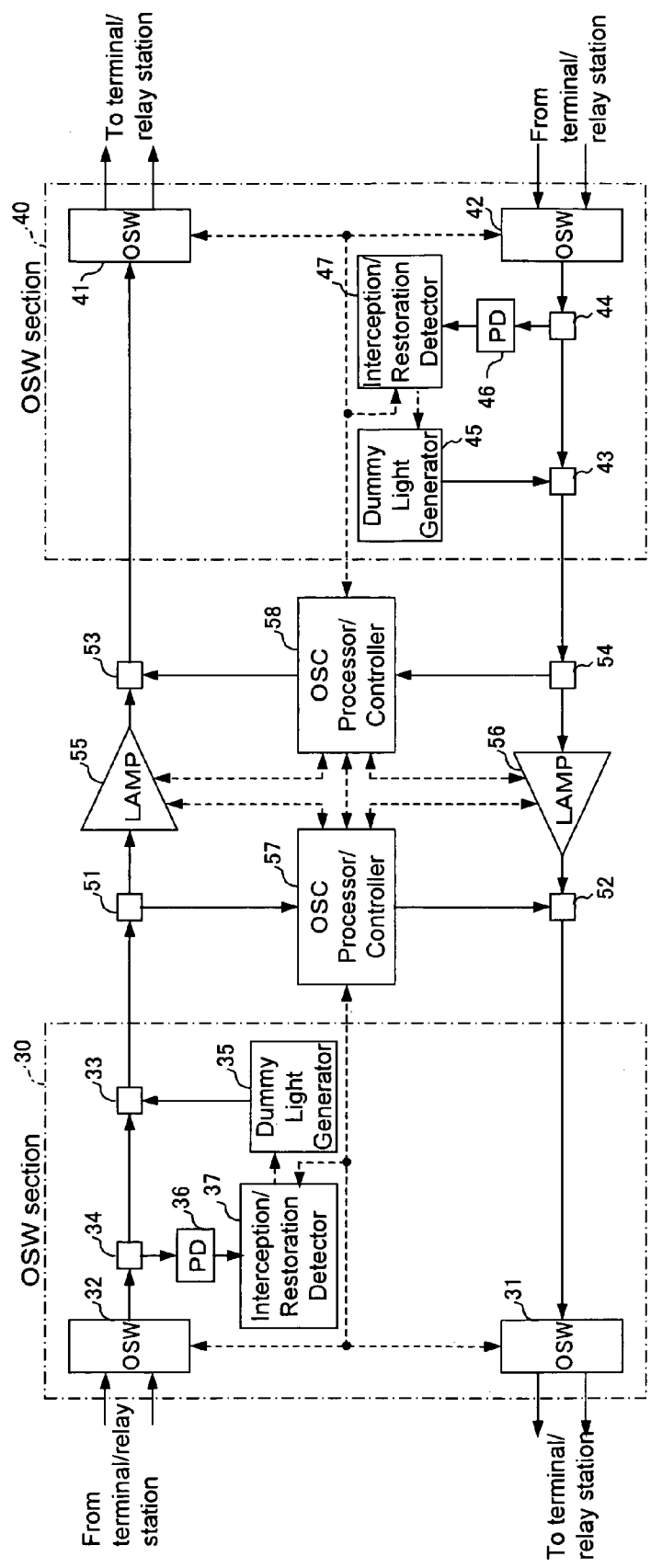
FIG. 3 shows a block diagram illustrating a detailed configuration of a relay station.

FIG. 3 shows a block diagram illustrating a detailed configuration of relay stations $2_i$ (i=1 to n−1). Relay station $2_i$ includes OSW sections 30, 40; WDM filters 51–54; optical amplifiers for relay (LAMP) 55, 56; and OSC processor/controllers 57, 58.

OSW section 30 includes OSW 31, 32, WDM filters 33, 34, a dummy light generator 35, a PD 36 and an interception/restoration detector 37. Also, OSW section 40 includes OSW 41, 42, WDM filters 43, 44, a dummy light generator 45, a PD 46 and an interception/restoration detector 47. Functions and configurations of OSW sections 30, 40 are identical to those of the aforementioned OSW section 20, and therefore the detailed description is omitted here.

To OSW section 30, a WDM optical signal (communication signal and OSC signal) is input from the neighboring terminal station $1_1$ or the neighboring relay station $2_{i−1}$ through the main transmission line F0 or the backup transmission line F1.

The input optical signal is supplied to WDM filter 51, and then separated into the communication signal and the OSC signal. The communication signal is input to LAMP 55, while the OSC signal is input to OSC processor/controller 57.

LAMP 55 includes an EDFA, etc. and an automatic control circuit, similarly to the aforementioned TAMP 13 or RAMP 14. LAMP 55 amplifies the input WDM optical signal into an optical signal having output power (level) in which ASE correction (described later in detail) is performed, under the control of OSC processor/controller 57.

The amplified WDM optical signal is multiplexed with an OSC signal by WDM filter 53. Thereafter, the multiplexed WDM optical signal is supplied to OSW section 40, and transmitted to the neighboring relay station $2_{i+1}$ or terminal station $1_2$ through the transmission line F0 or F1.

OSC processor/controller 57 supplies WDM filter 52 with the OSC signal to be transmitted to the neighboring relay station $2_{i−1}$. OSC processor/controller 57 also receives from WDM filter 51 the OSC signal included in the WDM optical signal having been received from relay station $2_{i−1}$, and performs predetermined processing (to be described later in detail). Further, OSC processor/controller 57 controls OSW section 30 (OSW 31, 32 and interception/restoration detector 37), LAMP 55, 56, etc. (to be described later in detail).

Meanwhile, to OSW section 40, a WDM optical signal (communication signal and OSC signal) is input from the neighboring terminal station $1_2$ or the neighboring relay station $2_{i+1}$, through the main transmission line R0 or the backup transmission line R1.

The input optical signal is supplied to WDM filter 54, and separated into the communication signal and the OSC signal. The communication signal is input to LAMP 56, while the OSC signal is input to OSC processor/controller 58.

LAMP 56 has a configuration similar to that of the aforementioned LAMP 55, and performs the similar processing. The WDM optical signal amplified by LAMP 55 is multiplexed with an OSC signal by WDM filter 52. Thereafter, the multiplexed WDM optical signal is supplied to OSW section 30, and transmitted to the neighboring relay station $2_{i−1}$ or terminal station $1_1$, through the transmission line R0 or R1.

OSC processor/controller 58 supplies WDM filter 53 with the OSC signal to be transmitted to the neighboring relay station $2_{i−1}$. OSC processor/controller 58 also receives from WDM filter 54 the OSC signal included in the WDM optical signal having been received from relay station $2_{i+1}$, and performs predetermined processing (to be described later in detail). Further, OSC processor/controller 58 controls OSW section 40 (OSW 41, 42 and interception/restoration detector 47), LAMP 55, 56, etc. (to be described later in detail).

FIG. 4 shows an example of the OSC structure. OSC has fields including communication line for supervision (DCC), order wire line (OW), information of the number of wavelengths, ASE correction information, switch state (SW state), control byte, and plural sets of pre-emphasis information.

The 'information of the number of wavelengths' represents the number of channels (namely, the number of wavelengths) multiplexed into the communication signal being transmitted, by use of a vector notation. As for this information of the number of wavelengths, OSC processor/controller 19 (refer to FIG. 2) of the sending terminal station 1 writes the number of channels being multiplexed into the wavelength information field, and sends to the neighboring relay station 2 located on the downstream side. Relay station 2 extracts this information of the number of wavelengths from the OSC once, and rewrites this information in the field of information of the number of wavelengths in the OSC, and then transmits this information to relay station 2 located on the downstream side. This procedure is repeated in each station, and finally OSC processor/controller 19 in the receiving terminal station 1 extracts this information of the number of wavelengths from the OSC.

In the 'ASE correction information field', ASE correction amount, which will be described later, variation of the optical signal power input to LAMP or RAMP, etc. are stored.

In the 'SW state field', each OSW state of terminal stations $1_1$, $1_2$, and relay stations $2_1$–$2_{n−1}$ is stored. The OSW state is represented by '0' when the corresponding OSW is switched to the main transmission line side, and represented by '1' when the corresponding OSW is switched to the backup transmission line side.

The 'control byte field' includes a command part and a SW switchover request indication part. As command set in the command part, code for preceding notification of switchover, code for triggering switchover, code for ASE correction completion notification, code for pre-emphasis control request, etc. are stored. Signification of these codes will be described later.

The 'pre-emphasis information fields' are prepared for the number of channels. In the fields, pre-emphasis control for each channel, namely each data for instructing an increase/decrease of each attenuation amount of VAT $10_1$–$10_m$ is stored.

The OSC signal is terminated in each station. More specifically, the OSC signal is multiplexed to the WDM optical signal in the OSC processor/controller of each station, and extracted from the WDM optical signal in the OSC processor/controller of the succeeding station. A new OSC signal is then multiplexed into a WDM optical signal by the OSC processor/controller of the succeeding station of interest, and is transmitted to the further succeeding station.

<Dummy Light Transmission Processing>

While switchover is executed when OSW is switched from the main transmission line side (hereafter referred to as #0 system) to the backup transmission line side (hereafter referred to as #1 system), or from #1 system to #0 system, an optical signal is intercepted in the OSW. As a result, the optical signal (WDM optical signal) is not transmitted on the transmission line between the OSW. Namely, the optical signal is intercepted (light interception) while the switchover is executed. This causes no optical signal input to each optical amplifier on the receiving side (LAMP 55 or 56 in relay station 2, and RAMP 14 in terminal station 1) during the interception.

After completion of the switchover, optical signal output to the transmission line from the OSW is resumed, and accordingly the optical signal is again input to the optical amplifier.

As such, when the light to be input to the optical amplifier is intercepted once, and input to the optical amplifier is resumed after the interception, the optical amplifier may possibly emit the energy having been accumulated after the interception immediately, together with the optical signal after being amplified from the input optical signal. In other words, a light surge may possibly occur. This light surge may damage (for example, melt) the transmission line (optical fiber).

In particular, since the optical amplifier amplifying the WDM optical signal outputs an optical signal in which power of the plural channels is added, the output optical signal power itself is large, and therefore, highly possibly, superposition of the light surge onto this power may damage the transmission line.

In order to prevent such occurrence of the light surge and to protect the transmission line, according to the embodiment of the present invention, the dummy light is input to the optical amplifiers (LAMP 55, 56 and RAMP 14) during the switchover.

This dummy light transmission is executed by interception/restoration detector 27 (37, 47) and dummy light generator 25 (35, 45), as described earlier (refer to FIGS. 2, 3).

Figure 5:
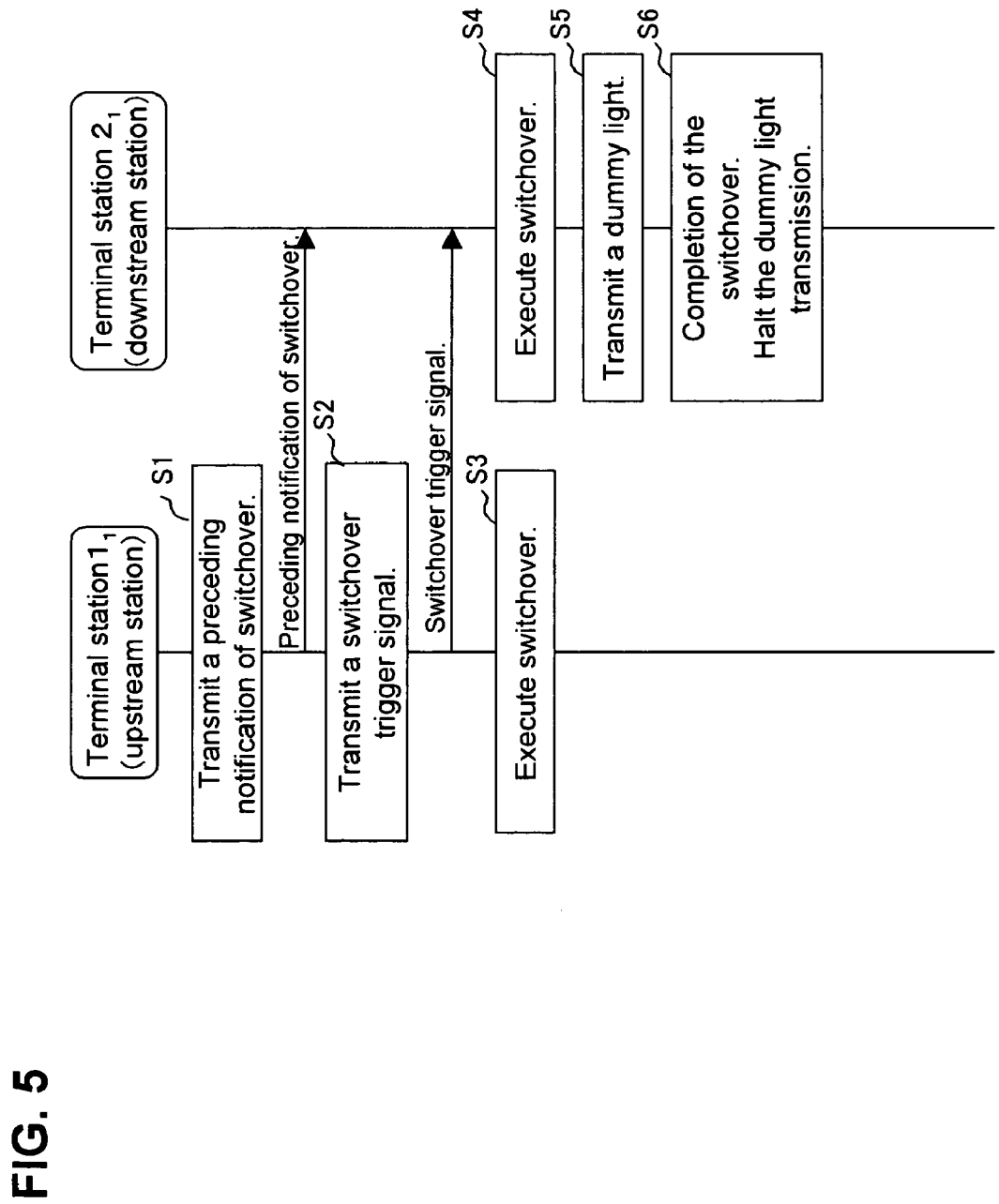
FIG. 5 shows a sequence diagram illustrating a processing flow of dummy light transmission.

FIG. 5 shows a sequence diagram illustrating a processing flow of the dummy light transmission. This sequence diagram illustrates, as an example, the transmission line between terminal station $1_1$ (station on the upstream side, hereafter referred to as upstream station) and relay station $2_1$ (station on the downstream side, hereafter referred to as downstream station) is switched over from the transmission line F0 to the transmission line F1. Namely, both OSW 21 (refer to FIG. 2) in OSW section 20 and OSW 32 (refer to FIG. 3) in OSW section 30 are switched over from #0 system to #1 system.

First, when the switchover of OSW 21 is to start, OSC processor/controller 19 in the upstream station transmits a preceding notification of switchover (more specifically, a code for the preceding notification of switchover, which is written in the command part of the control byte field in OSC (refer to FIG. 5)) to the neighboring downstream station, so as to notify OSC processor/controller 57 in the downstream station in advance, that the switchover is to be started (step S1).

The code for the preceding notification of switchover includes identification information of the station in which the switchover is to be executed; OSW identification information indicative of whether OSW 21 or OSW 22 is to be switched; and the direction of switchover indicative of whether the switchover is to be performed from #0 system to #1 system, or from #1 system to #0 system. In the example shown here, the identification information of terminal station $1_1$, and the identification information of OSW 21, and the switchover direction from #0 system to #1 system are included in the code for the preceding notification of switchover. From the above information, OSC processor/controller 57 in the downstream station recognizes that OSW 32 corresponding to OSW 21 is to be switched.

Subsequently, OSC processor/controller 19 in the upstream station transmits a switchover trigger signal (code for triggering switchover written in the command part of the OSC control byte) to OSC processor/controller 57 in the downstream station (step S2). This switchover trigger signal aims at reducing a time lag between the switchover timing of OSW 52 in the upstream station and the switchover timing of OSW 32 in the downstream station.

By sending and receiving the switchover trigger signal, OSC processor/controller 19 in the upstream station switches OSW 21 from #0 system to #1 system, and also OSC processor/controller 57 in the downstream station switches OSW 32 from #0 system to #1 system (steps S3, S4). By these switchovers, the transmission line in the direction from the upstream station to the downstream station is switched over from the main transmission line F0 to the backup transmission line F1.

During the period from the start to the completion of the switchover, the output light of OSW 21 and the output light of OSW 32 are intercepted. As a result, the light to be input to PD 36 in OSW section 30 of the downstream station is also intercepted, and the electric signal power (level) input to interception/restoration detector 37 from PD 36 is decreased.

OSC processor/controller 57 in the downstream station supplies a value (m), denoting the number of channels, to interception/restoration detector 37 in advance, based on the information of the number of wavelengths included in the received OSC. Interception/restoration detector 37 stores the supplied number of channels (m) into an internal storage (semiconductor memory, or the like). Also, interception/restoration detector 37 maintains, in the internal storage, a threshold (power value) to determine whether one channel signal (one wavelength) is in transmission.

Interception/restoration detector 37 divides the electric signal power from PD 36 by the stored number of channels (m), so as to obtain electric signal power value per channel. Interception/restoration detector 37 then compares this power value per channel with the stored threshold. If the former is smaller than the latter, interception/restoration detector 37 determines that the optical signal is intercepted (namely, the optical signal is not transmitted). On the other hand, if the former is not smaller than the latter, interception/restoration detector 37 determines that the optical signal is not intercepted (namely, the optical signal is being transmitted, or has been restored).

On determining that the optical signal is intercepted, interception/restoration detector 37 instructs dummy light generator 35 to output a dummy light. With this, dummy light generator 35 outputs the dummy light to WDM filter 33 (step S5). The dummy light is input to LAMP 55 through WDM filters 33, 51. As a result, occurrence of an interception condition of the input light to LAMP 55 can be prevented.

LAMP 55 amplifies this dummy light and outputs the amplified light. Accordingly, the dummy light is also input into the optical amplifiers provided in the stages succeeding to LAMP 55 (LAMP 55 in relay station 2 of the succeeding stage, and RAMP 14 in the receiving terminal station 1). Thus, occurrence of an interception condition of the light input to the optical amplifiers in the succeeding stages can be prevented.

Meanwhile, after the interception, when the switchovers of OSW 21, 32 are completed, and the WDM optical signal output from OSW 32 is restored, electric signal power being output from PD 36 is increased. As a result, interception/restoration detector 37 determines that the optical signal is not intercepted any more (namely, the optical signal has been restored). With this determination, dummy light generator 35 halts outputting the dummy light (step S6). As a result, only the WDM optical signal is input to LAMP 55.

As such, even in a condition that the WDM optical signal is not input to LAMP 55 from OSW 32, the dummy light is input to LAMP 55 and the optical amplifiers in the succeeding stages (on the downstream side), and accordingly, generation of the light surge in the optical amplifiers is prevented.

Further, since the dummy light is output only when the WDM optical signal is intercepted, a cost increase of electric power, etc. can be restrained.

Additionally, the preceding notification of switchover and the switchover trigger signal may be transmitted from the downstream station to the upstream station.

Also, in the above description, the switchover of the transmission line in the forward direction between terminal station $1_1$ and relay station 2 has been explained. As to the dummy light transmission processing at the time of switching the transmission line in the reverse direction, the same processing as the aforementioned processing is performed, except for replacing the upstream station with the downstream station. For example, interception/restoration detector 27 of terminal station $1_1$ decides an interception/restoration of the optical signal based on the electric signal from PD 26, and according to this decision, interception/restoration detector 27 controls dummy light generator 25 to output/halt the dummy light. Also, the dummy light transmission processing is performed in a similar manner in the cases of a transmission line switchover between relay station $2_i$ and relay station $2_{i+1}$ in the forward direction, a transmission line switchover therebetween in the reverse direction, a transmission line switchover between relay station $2_{n-1}$ and terminal station $1_2$ in the forward direction, and a transmission line switchover therebetween in the reverse direction.

<ASE Correction>

When a transmission loss varies as a result of an OSW switchover, the input power (input level) being input to an optical amplifier also varies. As the input level varies, the ASE light level generated by the optical amplifier varies, which may influence amplification in the succeeding amplifiers. Such an undesirable influence can be solved by ASE correction.

Figure 6:
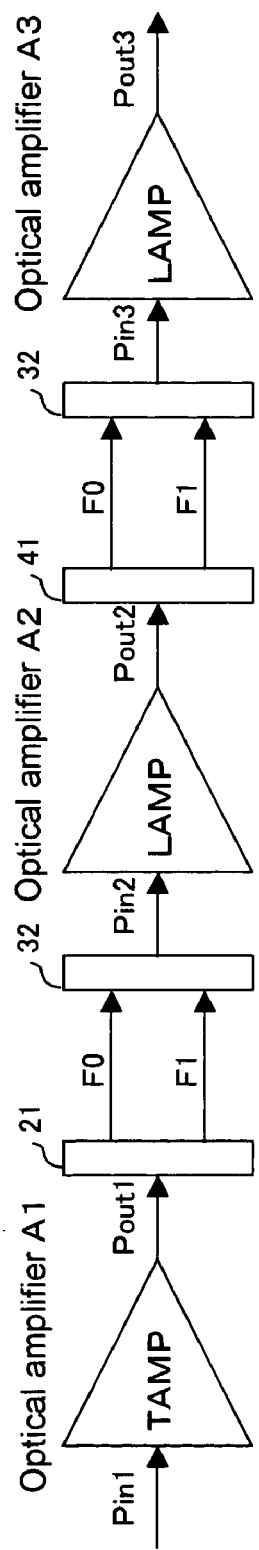
FIG. 6 shows an explanation diagram of ASE correction.

FIG. 6 shows an explanation diagram of the ASE correction. For the sake of easy understanding of the explanation, a block diagram is illustrated only for the portions including the optical amplifiers in both a sending terminal station $1_1$ and relay stations $2_1$, $2_2$ on the downstream side (TAMP 13 and two LAMP 55), OSW disposed between these optical amplifiers, and transmission lines.

An optical amplifier A1 shown in the preceding stage corresponds to TAMP 13 in terminal station $1_1$, an optical amplifier A2 shown in the middle stage corresponds to LAMP 55 in relay station $2_1$, and an optical amplifier A3 shown in the succeeding stage corresponds to LAMP 55 in relay station $2_2$, respectively.

Each optical amplifier A1–A3 (and any other optical amplifiers included in the other relay stations and the terminal station) executes automatic level control (ALC). This ALC signifies that the optical amplifier monitors both optical signal power (input level) which is input to the optical amplifier concerned (unit: [W] or [mW]) and optical signal power (output level) which is output from the optical amplifier concerned (unit: [W] or [mW]), and controls an amplification factor (which is referred to as 'amplification amount' in case of the dB notation) so that the output level reaches a target level.

A communication signal input to the optical amplifier A1 is amplified in the optical amplifier A1, and the amplified signal is output therefrom. Assuming that the amplification factor of the optical amplifier A1 is G1, the power (level) of the communication signal for one channel is Pin0, the number of multiplexed wavelengths is m, the output level is Pout1, then the output level Pout1=G1·m·Pin0, when no noise component is included. Accordingly, the optical amplifier A1 executes ALC by setting the target level to G1·m·Pin0.

However, when the optical amplifier A1 amplifies the input optical signal and outputs the amplified signal, an ASE (amplified spontaneous emission) light (noise component) is simultaneously output. Because of this ASE light, the output level Pout1 becomes as follows:

$$Pout1 = G1 \cdot m \cdot Pin0 + Pase1 \quad (1)$$

$$= G1 \cdot Pin1 + Pase1$$

Here, Pase1 is an ASE light (noise component) level (ASE level). Also, Pin1 is a total level, m·Pin0, of (m) input optical signals.

Therefore, it is required that the optical amplifier A1 executes ALC with the target level set to (G1·Pin1+Pase1).

Here, in order that the optical signal can be received without producing errors on the receiving side even if the optical signal is attenuated in the transmission line, the communication signal level (signal level) G1·Pin1 included in the output light is required to have a predetermined level (shown as S). Namely, $$G1 \cdot Pin1 = S \quad (2)$$

Further, the predetermined level S equals to a predetermined level (defined as Psig) of the optical signal per channel multiplied by the number of the multiplexed channels (m). Namely, $$S = m \cdot Psig \quad (3)$$

In the optical amplifier A1 (and other optical amplifiers), the predetermined level (Psig) per channel is stored in advance, and the predetermined value S is obtained by multiplying Psig by the number of multiplexed channels (m).

From the above formulae (1)–(3), the following is obtained:

$$Pout1 = S + Pase1 \qquad (4)$$
$$= m \cdot Psig + Pase1$$

Meanwhile, the ASE level Pase1 can be expressed as follows:

$$Pase1 = h \cdot v Pin1 \cdot (G1-1) \cdot B \cdot Nf \qquad (5)$$

where, h is Planck constant, v is an ASE light frequency, B is a gain bandwidth of the optical amplifier A1. Also, Nf is a noise figure of the optical amplifier A1, which varies with the input level Pin1. However, Nf can be obtained based on the input level Pin1 (for example, using a calculation formula, or a table of correspondence between Pin1 and Nf).

The optical amplifier A1 (and the other optical amplifiers) retains the formula (5), and the calculation formula or the table of correspondence for obtaining Nf. Thus, the own ASE level Pase1 can be obtained. (The same method is applicable to other optical amplifiers.)

Therefore, the optical amplifier A1 obtains the levels m·Psig and Pase1, obtains the target level Pout1 therefrom, using the formula (4), and then executes ALC so that the monitored output level reaches equal to the obtained target level Pout1. With this, it becomes possible to set the communication signal level included in the output light of the optical amplifier A1 equal to the predetermined level S.

As such, correcting the target level to have a value in which the ASE level is added to the signal level S=G1·Pin1, namely (G1·pin1+Pase1), is termed as ASE correction. And, $$\eta 1 = (G1 Pin1 + Pase1)/(G1 \cdot Pin1) \qquad (6)$$

is defined as ASE correction factor.

Additionally, the optical amplifier A1 can obtain the target level by multiplying the predetermined level S (=G1·Pin1) by the ASE correction factor η1.

The optical signal output from the optical amplifier A1 is input to the optical amplifier A2 through OSW 21, the main transmission line F0, and OSW 32. At this time, the optical signal attenuates to some extent (with an attenuation factor L1) by the main transmission line F0.

Therefore, assuming an optical signal level of input to the optical amplifier A2 is Pin2, $$Pin2 = Pout1/L1 \qquad (7)$$
$$= (G1 \cdot Pin1 + Pase1)/L1$$

Assuming an amplification factor of the optical amplifier A2 is G2, a target level (output level) is Pout2, and an ASE level is Pase2, $$Pout2 = G2 \cdot Pin2 + Pase2 \qquad (8)$$
$$= G2 \cdot (G1 \cdot Pin1 + Pase1)/L1 + Pase2$$
$$= G2 \cdot G1 \cdot Pin1/L1 + G2 \cdot Pase1/L1 + Pase2$$

In the optical amplifier A2 also, it is required that the communication signal level included in the output light reaches the predetermined level S (=G1·Pin1). In the above-mentioned formula (8), since the signal level is G2·G1·Pin1/L1, $$S = G1 \cdot Pin1 = G2 \cdot G1 \cdot Pin1/L1 \qquad (9)$$

Namely, it is sufficient if G2=L1. Therefore, $$Pout2 = G1 Pin1 + Pase1 + Pase2 \qquad (10)$$

Accordingly, the optical amplifier A2 monitors the output level, and executes ALC so that the output level reaches the value (target level) shown in the formula (10).

Here, in the optical amplifier A2, the value of Psig is stored in advance, as in the case of the optical amplifier A1. Thus, the optical amplifier A2 can obtain the predetermined level S=G1·Pin1 by multiplying Psig by the number of channels (m) supplied from the information of the number of wavelengths in OSC from the upstream station (terminal station $1_1$ in this case). Also, the optical amplifier A2 can obtain the ASE level, Pase2, output from the optical amplifier A2, according to the above-mentioned formula (5).

On the other hand, since the ASE level Pase1 is the value for the optical amplifier A1 in the preceding stage, the optical amplifier A2 cannot acquire this Pase1. Therefore, by receiving the ASE level, Pase1, of the optical amplifier A1 in the preceding stage from this optical amplifier A1, the optical amplifier A2 obtains the target level according to the formula (10).

Additionally, assuming the ASE correction factor of the optical amplifier A2 is η2, $$\eta 2 = (G1 \cdot Pin1 + Pase1 + Pase2)/(G1 \cdot Pin1) \qquad (11)$$
$$= \eta 1 + Pase2/(G1 \cdot Pin1)$$

Thus, it is also possible for the optical amplifier A2 to obtain the target level by multiplying the predetermined level S (=G1·Pin1) by the ASE correction factor η2.

In a similar way, as to the optical amplifier A3, the target level (output level) Pout3 becomes, $$Pout3 = G3 \cdot (G1 \cdot Pin1 + Pase1 + Pase2)/L2 + Pase3 \qquad (12)$$
$$= G1 \cdot Pin1 + Pase1 + Pase2 + Pase3$$

where, G3 is the amplification factor of the optical amplifier A3, Pase3 is the ASE level of the optical amplifier A3, and L2 is the attenuation factor of the transmission line from the optical amplifier A2 to the optical amplifier A3.

The optical amplifier A3 can acquire the target level Pout3 by receiving both the ASE level Pase1 of the optical amplifier A1 and the ASE level Pase2 of the optical amplifier A2 (namely Pase1+Pase2) from the optical amplifier A2 disposed in the middle stage. With this, the optical amplifier A3 executes ALC.

Additionally, an ASE correction factor η3 becomes, $$\eta 3 = (G1 \cdot Pin1 + Pase1 + Pase2 + Pase3)/(G1 \cdot Pin1) \qquad (13)$$
$$= \eta 2 + Pase3/(G1 \cdot Pin1)$$

As such, each optical amplifier receives, from the optical amplifier located on the upstream side (in the preceding stage), the total value (hereafter referred to as 'ASE correction amount') of the ASE levels accumulated in the entire optical amplifiers located on the upstream side. Thus, each target level of the output signal from each optical amplifier can be obtained, and based on the obtained target level, each optical amplifier executes ALC. The ASE correction amount is expressed by the following formula, on assumption that the number of optical amplifiers located on the upstream side of the optical amplifier of interest is q, the ASE level of the i-th optical amplifier is Pasei:

$$\eta 3 = (G1 \cdot Pin1 + Pase1 + Pase2 + Pase3)/(G1 \cdot Pin1) \quad (13)$$
$$= \eta 2 + Pase3/(G1 \cdot Pin1)$$

The output level of the optical amplifier A1 in the preceding stage is controlled so as to become the target level as a result of ALC executed by the optical amplifier A1 in the preceding stage. Therefore, so far as the attenuation amount L1 of the transmission line F0 is not varied, the input level of the optical signal input to the optical amplifier A2 in the middle stage has a constant value. As a result, the ASE level Pase2 output from the optical amplifier A2 in the middle stage has a constant value.

Accordingly, once the optical amplifier A2 in the middle stage supplies the own ASE level Pase2 (and the ASE level Pase1 of the optical amplifier A1 in the preceding stage) to the optical amplifier A3 in the succeeding stage, the optical amplifier A3 in the succeeding stage can perform the ASE correction (ALC) based on the same ASE correction amount (Pase1+Pase2).

However, when the transmission line is switched over from #0 system to #1 system, or from #1 system #0 system, as a result of the switchovers of OSW 21, 32 disposed between the optical amplifiers A1, A2, the attenuation factor L1 is varied as a result of variations of transmission line lengths, quality of the material of the transmission line, transmission line parameters, etc. caused by secular change, or the like. As a result, as it is apparent from the above formula (7), the input level Pin2 of the optical amplifier A2 in the middle stage is varied (either increases or decreases). Also, apparently from the above formula (5), the ASE level Pase2 of the optical amplifier A2 is varied.

When the ASE level Pase2 of the optical amplifier A2 is varied, this influences ALC (ASE correction) of the optical amplifier A3 in the succeeding stage, and the other optical amplifier(s) in the further succeeding stage(s), as is apparent from the formula (12).

Therefore, even on the occurrence of switchover, ALC and the ASE correction have to be performed properly so that the signal level included in the optical signal output from each optical amplifier has the predetermined value S. As to methods for the ASE correction, the following three methods are considered.

(1) First Method of ASE Correction

The first method of ASE correction is that, on the occurrence of an OSW switchover, a downstream station transmits a new ASE correction amount to the neighboring downstream station, and that the downstream station performs the ASE correction based on the newly received ASE correction amount.

Figure 7:
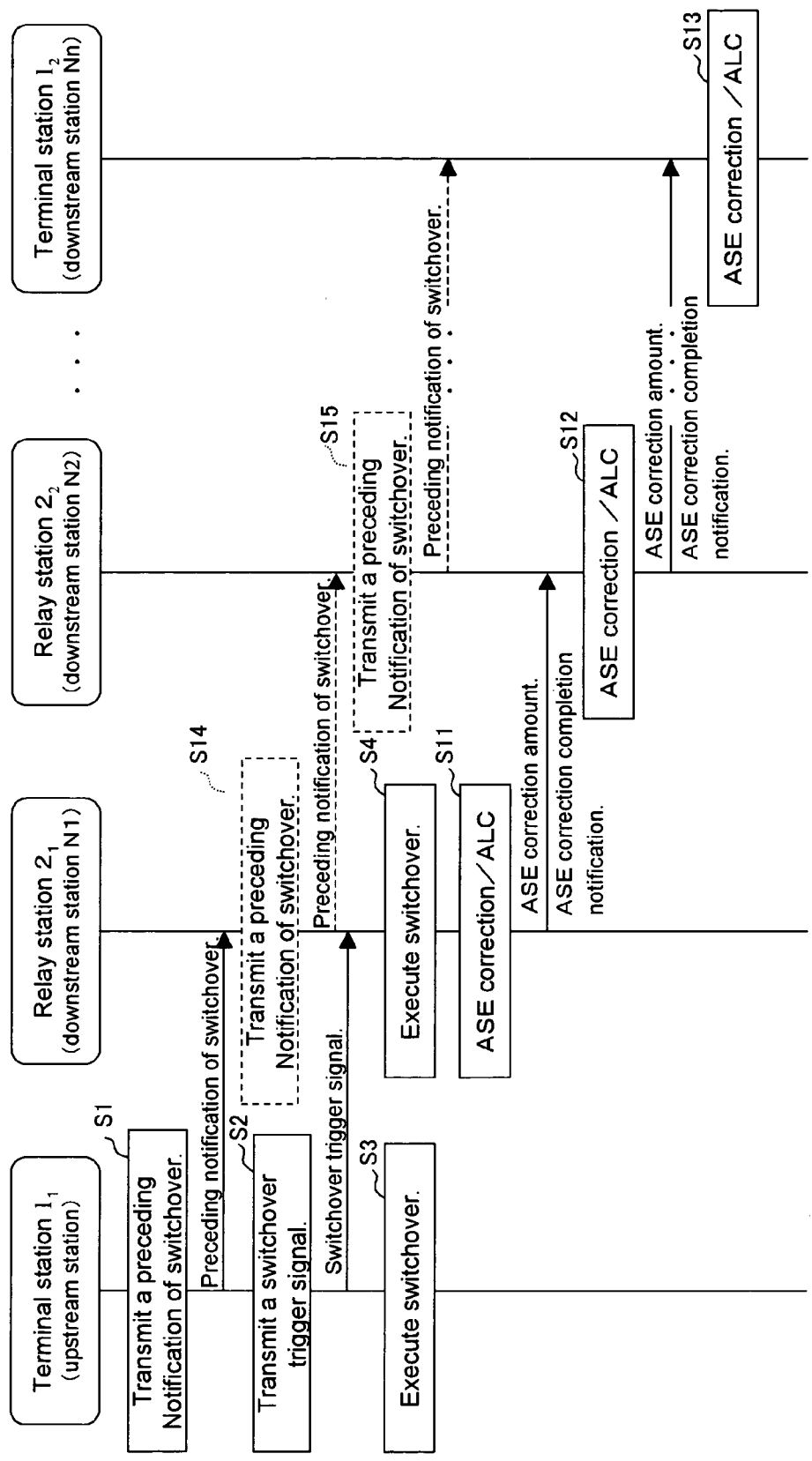
FIG. 7 shows a sequence diagram illustrating a processing flow of the first method of ASE correction.

FIG. 7 shows a sequence diagram illustrating a processing flow of the first method of the ASE correction. This sequence diagram illustrates, as one example, a case that the transmission line between terminal station $1_1$ (upstream station) and relay station $2_1$ (downstream station N1) is switched from #0 system to #1 system (refer to FIG. 1). Here, the same symbols are assigned to the same processing as that having been described in FIG. 5, and the detailed description of the processing is omitted.

With the transmission of a preceding notification of switchover and a switchover trigger signal from the upstream station (steps S1, S2), both OSW 21 in the upstream station and OSW 32 in the downstream station N1 are switched from #0 system to #1 system, and the transmission line between these stations is switched from the transmission line F0 to the transmission line F1 (refer to FIGS. 2, 3, which are also referred to in the following.)

Additionally, while this switchover is in execution, the downstream station N1 performs the aforementioned dummy light transmission. Further, it may also be possible that the downstream stations N1–Nn–1 (relay station $2_1$–$2_{n-1}$) successively transmit the preceding notification of switchover to each neighboring downstream station N2–Nn (relay station $2_2$–$2_{n-1}$, terminal station $1_2$) (steps S14, S15). In such a case, OSC processor/controller 58 in each relay station $2_1$–$2_{n-1}$ stores the preceding notification of switchover in the command part of the control byte of OSC, in the form of a code for the preceding notification of switchover, and transmits the notification through WDM filter 53.

After the switchover is completed, LAMP 55 (optical amplifier A2 in FIG. 6) in the downstream station N1 calculates the own ASE level Pase2 according to the above formula (5), based on the input level Pin1 being input after the switchover. An ASE correction amount (Pase1+Pase2) is then obtained using the own ASE level Pase2 calculated above and the ASE correction amount Pase1 supplied from the upstream station. Thereafter, LAMP 55 acquires the target level based on the obtained ASE correction amount, and executes ALC according to this target level (step S11).

Here, the ASE correction amount Pase1 of the upstream station has been supplied, as initial value, to LAMP 55 of the downstream station at the time of initiating this WDM optical communication system, and stored in LAMP 55.

LAMP 55 transmits the WDM optical signal, which is controlled by ALC to the target level, to the downstream station N2. At the same time, LAMP 55 supplies the newly obtained ASE correction amount (Pase1+Pase2) to OSC processor/controller 58.

OSC processor/controller 58 writes the supplied ASE correction amount (Pase1+Pase2) into the ASE correction information field in OSC, and also writes a code for a notification of the ASE correction completion into the control byte field (command part) of OSC. OSC processor/controller 58 then transmits this OSC signal to the downstream station N2 through WDM filter 53.

The OSC signal transmitted from the downstream station N1 is supplied to OSC processor/controller 57 in the downstream station N2 through WDM filter 51. OSC processor/controller 57 in the downstream station N2 recognizes that the ASE correction amount has been varied, by receiving a code for the notification of the ASE correction completion being included in the control byte field (command part) of OSC. With this, OSC processor/controller 57 in the downstream station N2 reads out the ASE correction amount (Pase1+Pase2) from the ASE correction information field in OSC, and supplies this ASE correction amount to LAMP 55 in the downstream station N2.

LAMP 55 in the downstream station N2 executes the ASE correction and ALC, similarly to the aforementioned LAMP 55 in the downstream station N1, and supplies the ASE correction amount (Pase1+Pase2+Pase3) having been obtained by the processing of the ASE correction and ALC, to OSC processor/controller 58. This ASE correction amount is further transmitted to the downstream station N3.

Such processing is successively performed in each downstream station.

Sufficiently, this transmission of the ASE correction amount to the downstream station is performed only once immediately after the transmission line switchover. The reason is that each downstream station N1–Nn stores each new ASE correction amount transmitted from the preceding station, and thereafter the ASE correction can be performed based on the stored new ASE correction amount. Also, by limiting the transmission to only once after the switchover, processing cost in each station can be reduced.

The same processing as shown above is performed when transmission line switchover is performed in any other transmission lines.

And, thereafter, when any of the transmission line is switched, new ASE correction amount is acquired in the downstream station located in the downstream point of the switchover, and the acquired ASE correction amount is transmitted between the stations concerned.

According to this first method, even when the loss, or the like, is varied because of the switchover, this variation is compensated, enabling proper performance of the ASE correction against the optical amplifier in each station. As a result, ALC can be executed so that signal levels can be maintained to the predetermined levels. Further, this first method does not require any optical attenuator on the transmission line, and is applicable to networks of any structure.

Additionally, it may also be possible for the downstream station N1 to monitor whether the input level is varied when the switchover has been performed. If the input level is not varied (namely, if the same attenuation factor (loss) of the transmission line is maintained before and after the switchover), the processing shown in FIG. 7 can be omitted, enabling processing cost reduction.

Also, the ASE correction amount may be another value than that shown in the formula (13), if it is possible to obtain an accumulated value of the ASE level accumulated from the optical amplifier in the first stage to the optical amplifier in the preceding stage. For example, the values indicative of the output level (target level) of the preceding optical amplifier, the ratio of the ASE level to the output level, the ratio of the signal level to the output level, etc. may be supplied to the succeeding optical amplifier, as ASE correction amount.

Further, processing shown in the steps S1, S2 may be executed by the downstream station N1, and the preceding notification of switchover and the switchover trigger signal may be transmitted from the downstream station N1 toward the upstream stations. (This is also applicable in both the second method and the third method described in the following.)

(2) Second Method of ASE Correction

The second method of ASE correction is that the upstream station corrects the output level on the by OSW switchover.

Figure 8:
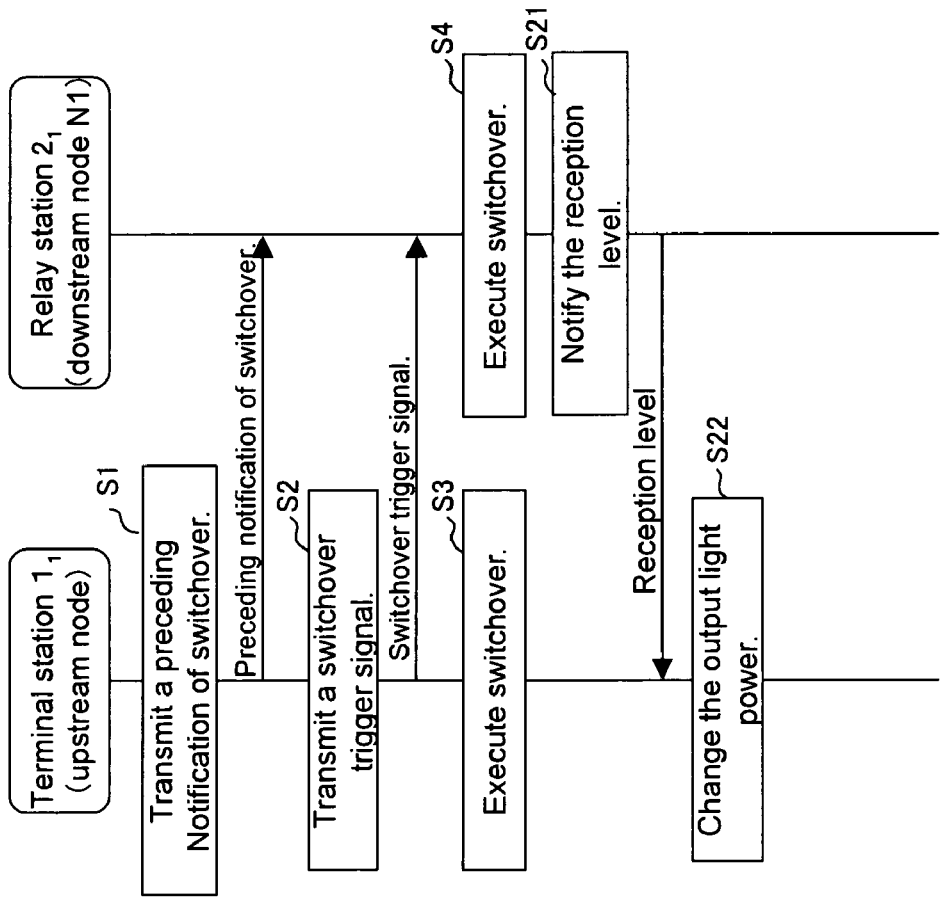
FIG. 8 shows a sequence diagram illustrating a processing flow of the second method of ASE correction.

FIG. 8 shows a sequence diagram illustrating a processing flow of the second method of the ASE correction. This sequence diagram illustrates, as one example, a case that the transmission line between terminal station $1_1$ (upstream station) and relay station $2_1$ (downstream station N1) is switched from #0 system to #1 system. The same numerals are assigned to the same processing as that having been described in FIG. 5 or FIG. 7, and the detailed description of the processing is omitted.

By transmitting a preceding notification of switchover and a switchover trigger signal from the upstream station (steps S1, S2), OSW 21 in the upstream station and OSW 32 in the downstream station N1 is switched from #0 system to #1 system, and the transmission line between these stations is switched from the transmission line F0 to the transmission line F1. Here, while this switchover is in execution, the downstream station N1 performs the aforementioned dummy light transmission.

After the switchover is completed, LAMP 55 in a downstream station N2 measures the input level (reception level). LAMP 55 then acquires a rate of change ΔX of the input Pin21 after the switchover, to the input level Pin20 before the switchover.

$$\Delta X = Pin21/Pin20 \quad (14)$$

This rate of change ΔX corresponds to the rate of change ΔL of the transmission line attenuation factor caused by the transmission line switchover. Namely, when the attenuation factor of the transmission line is varied from L10 to L11, it is possible to define ΔL as follows:

$$\Delta L = L11/L10 = 1/\Delta X = Pin20/Pin21 \quad (15)$$

Therefore, in the optical amplifier (TAMP 13) of the upstream station, by producing the output level thereof after the switchover ΔL times (=1/ΔX times) as high as the output level before the switchover, the downstream station N1 can receive the WDM optical signal having the same level as that received before the switchover.

Namely, LAMP 55 supplies this rate of change ΔX to OSC processor/controller 57, and OSC processor/controller 57 writes the rate of change ΔX into the ASE correction information field of OSC, and transmits this rate of change ΔX to the upstream station (step S21).

OSC processor/controller 19 in the upstream station supplies the rate of change ΔX received from the downstream station N1 to TAMP 13. TAMP 13 executes ALC with a new target level obtained by multiplying the target level having been used up to the present by 1/ΔX.

In each optical amplifier provided in the downstream station N1 and the downstream stations N2–Nn, because the ASE correction amount is not varied, the ASE correction is performed in the same way as that having been performed so far, based on the ASE correction amount having been stored.

The similar processing is performed when such a switchover is performed on any other transmission lines.

In addition, the aforementioned modification of the target level (namely, modification of output level) in TAMP 13 of the upstream station is preferably maintained within a range such that, after the modification of the output level, the ratio of the signal level (level of the communication signal component) to the ASE level included in the output signal after the modification substantially equals to the ratio of the signal level to the ASE level included in the output signal before the modification.

According to this second method also, even when the loss, or the like, is varied resulting from the switchover, this variation is compensated, and the optical amplifier in each station can perform the ASE correction properly. As a result, ALC can be executed so that the signal level can be maintained to the predetermined level S. Further, this second method requires no optical attenuator on the transmission lines, and is applicable to networks of any structure. Also, according to the second method, only two stations having performed the switchover perform the processing, without need of processing in other stations. Therefore, the processing cost can be reduced.

Additionally, in case that the input level to LAMP 55 of the downstream station N1 is not varied (namely, the same attenuation factor of the transmission line is maintained before and after the switchover), it may also be possible for the downstream station N1 not to transmit the rate of change ΔX to the upstream station. With this, processing cost can be reduced. Further, the rate of change ΔX is merely an example, and other values (for example, the reciprocal (=1/ΔX)) may be applicable.

(3) Third Method of ASE Correction

The third method of the ASE correction is that each station retains an ASE correction table specifying an ASE correction factor η corresponding to each condition of whether the optical signal is being transmitted using #0 system or #1 system between each station (in other words, OSW state of each station, i.e. either #0 system or #1 system), and that each station performs the ASE correction and ALC based on this ASE correction table.

Figure 10:
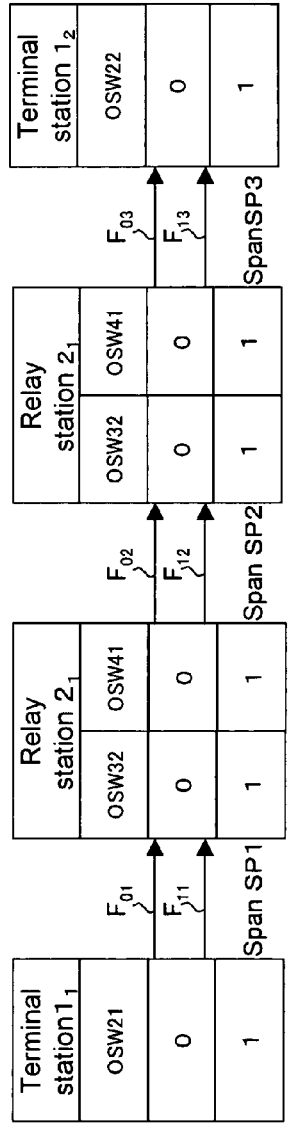
FIG. 10A shows OSW states of a terminal station and a relay station in the forward direction by use of symbols '0' and '1', in case the number of relay stations is two.
FIG. 10B shows OSW states using a tabular form.

FIG. 10A shows OSW states in terminal station 1 and relay stations $2_1$, $2_2$ in the forward direction using symbols '0' and '1', in case the number of relay stations is two (namely, n=3 in FIG. 1). The symbol '0' denotes a state that the OSW is switched to a main system (namely, #0 system), while the symbol '1' denotes a state that the OSW is switched to a backup system (namely, #1 system).

In order to transmit optical signals between two stations, OSW state in both ends of the span has to be coincident. For example, as to a span SP1, when OSW 21 in terminal station $1_1$ is switched to #0 system, also OSW 32 on the receiving side of relay station $2_1$ has to be switched to #0 system. Also, when OSW 21 in terminal station $1_1$ is switched to #1 system, OSW 32 on the receiving side of relay station $2_1$ has to be switched to #1 system. Namely, the OSW state on the sending side has to be coincident with the OSW state on the receiving side. Therefore, the number of the OSW states specifying the states of three spans SP1–SP3 (either #0 system or #1 system) located between the successive four stations becomes $2^3=8$. (In general, there are $2^n$ OSW states when the number of spans is n.) FIG. 10B denotes such OSW states shown in a tabular form.

With respect to these eight (8) combinations of OSW states, tables specifying each predetermined ASE correction factor η are provided in relay stations $2_1$, $2_2$ and the receiving terminal station $1_2$.

FIG. 11 shows an example of an ASE correction table in relay station $2_1$. On the upstream side of relay station 2, in the forward direction, only the sending terminal station $1_1$ exists. Therefore, relay station $2_1$ includes only two ASE correction factors, corresponding to the states of OSW 21 in the sending terminal station $1_1$, and OSW 32 of the relay station $2_1$ concerned. When OSW 21 and OSW 32 are switched on #0 system, an ASE correction factor η10 is selected, while when OSW 21 and OSW 32 are switched on #1 system, an ASE correction factor η11 is selected. According to the selected correction factor, a target level is determined.

FIGS. 12A, 12B show examples of the ASE correction table in relay station $2_2$. On the upstream side of relay station $2_2$ in the forward direction, the sending terminal station $1_1$ and relay station $2_1$ exist. Therefore, there are provided an ASE correction table 1 (refer to FIG. 12A) for use on the occurrence of switchover between the sending terminal station $1_1$ and relay station $2_1$, and an ASE correction table 2 (refer to FIG. 12B) for use on the occurrence of switchover between relay station $2_1$ and relay station $2_2$.

ASE correction table 1 includes four (4) patterns of the ASE correction factors, corresponding to OSW 21 in the sending terminal station $1_1$, OSW 32 and OSW 41 in relay station $2_1$, and OSW 32 in relay station $2_2$. By way of example, if both OSW 21 in the sending terminal station $1_1$ and OSW 32 in relay station $2_1$ are switched onto #0 system, and both OSW 41 of relay station $2_1$ and OSW 32 of relay station $2_2$ are switched onto #1 system, then an ASE correction factor η21 is selected.

ASE correction table 2 includes two kinds of the ASE correction factors, corresponding to OSW 41 of relay station $2_1$ and OSW 32 of relay station $2_2$.

FIGS. 13A–13C show examples of the ASE correction table of terminal station $1_2$. On the upstream side of terminal station $1_2$ in the forward direction, the sending terminal station $1_1$ and relay stations $2_1$, $2^2$ exists. Accordingly, there are provided an ASE correction table 11 (refer to FIG. 13A) for use on the occurrence of switchover between the sending terminal station $1_1$ and relay station $2_1$, and an ASE correction table 12 (refer to FIG. 13B) for use on the occurrence of switchover between relay station $2_1$ and relay station $2_2$, and an ASE correction table 13 (refer to FIG. 13C) for use on the occurrence of switchover between relay station $2_2$ and terminal station $1_2$.

ASE correction table 11 has 8 kinds of the ASE correction factors, ASE correction table 12 has 4 kinds of the ASE correction factors, and ASE correction table 13 has 2 kinds of the ASE correction factors.

These ASE correction factors are obtained from the above formulae (6), (11), etc., based on the input level of each optical amplifier, the ASE correction amount, etc. which are measured through experiments, system test operation, actual system operation, etc. These ASE correction factors are stored in the optical amplifiers (LAMP 55, 56, RAMP 14) or OSC processor/controllers 19, 57, 58 provided in the respective stations.

Figure 9:
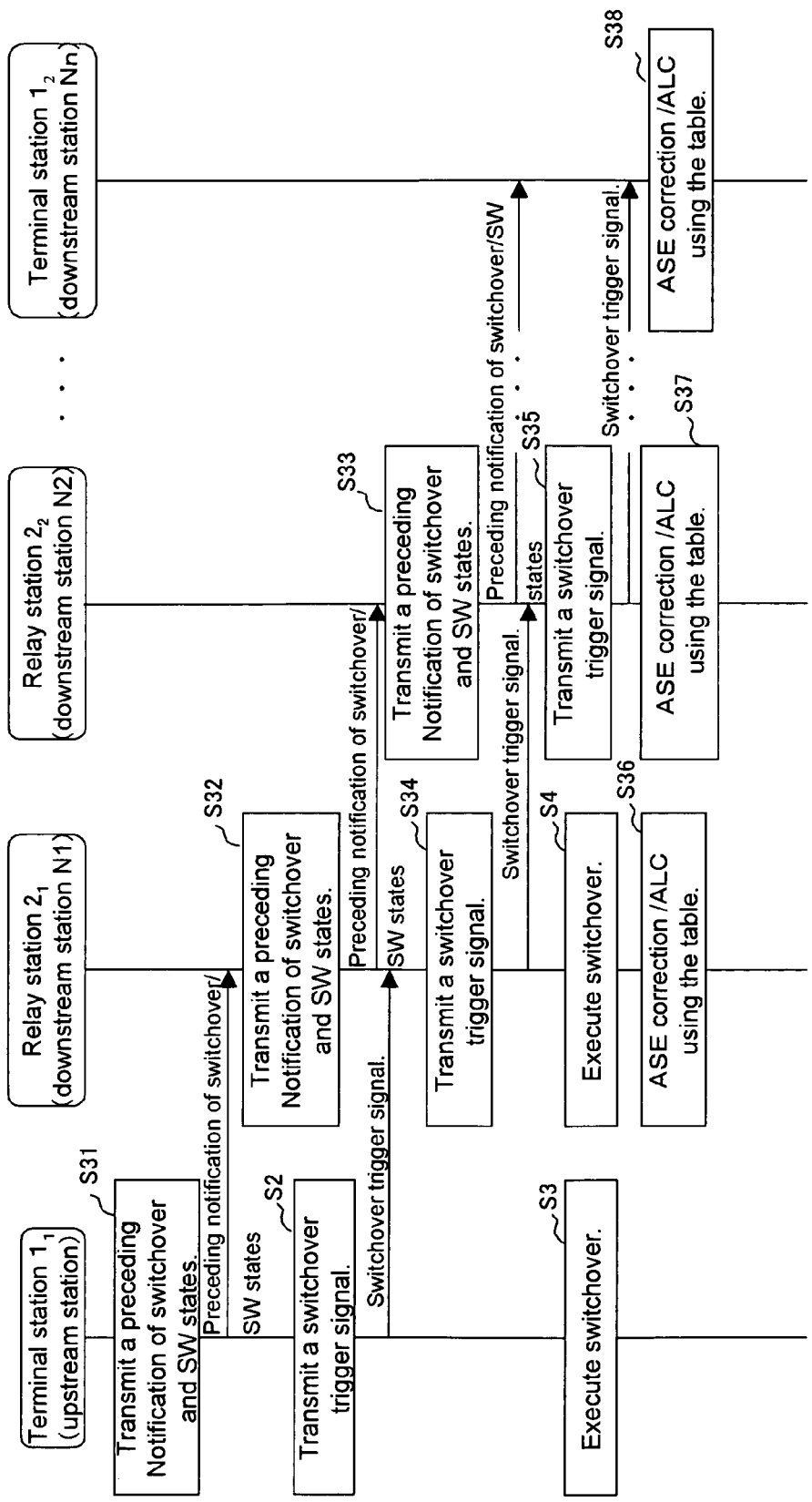
FIG. 9 shows a sequence diagram illustrating a processing flow of the third method of ASE correction.

FIG. 9 shows a sequence diagram illustrating a processing flow of the third method of the ASE correction. In this sequence diagram, as an example, the processing performed when the transmission line in use between terminal station $1_1$ (upstream station) and relay station $2_1$ (downstream station N1) is switched from #0 system to #1 system. The same symbols are assigned to the same processing as that shown in FIG. 5, and the detailed description is omitted.

The upstream station transmits a preceding notification of switchover and a switch state to the downstream station N1 using OSC (step S31). The preceding notification of switchover is written into the control byte field (command part) in OSC, and a switch state is written in the SW state field in OSC (refer to FIG. 4).

As described earlier, the preceding notification of switchover includes identification information of the station executing the switchover, OSW identification information, and a direction of the switchover. The SW state includes OSW identification information and an OSW state. The OSW state is expressed, for example, by 0 when OSW 21 is switched to #0 system, and by 1 when OSW 21 is switched to #1 system, as in the case of table contents in FIG. 10B.

On receipt of OSC transmitted from the upstream station, OSC processor/controller 57 in the downstream station N1 supplies the preceding notification of switchover included in OSC to OSC processor/controller 58 of the station concerned. Meanwhile, as to the SW state included in this OSC, after adding the state of OSW 32 (OSW on the receiving side, for example, 0 or 1) to this SW state, OSC processor/controller 57 supplies this added SW state to OSC processor/controller 58 and LAMP 55 in the station concerned.

As a result of the state (for example, 0 or 1) of OSW 32 (OSW on the receiving side) of the station concerned being added to the SW state, the new SW state becomes {the state of OSW 21 on the upstream station, the state of OSW 32 on the downstream station}. Also, as a result of the SW state being supplied to LAMP 55, LAMP 55 can select the ASE correction table corresponding to the supplied SW state, and the ASE correction factor in the selected ASE correction table.

OSC processor/controller 58 rewrites the preceding notification of switchover supplied from OSC processor/controller 57 into OSC. Also, OSC processor/controller 58 adds the state (for example, 0 or 1) of OSW 41 (OSW on the transmitting side) of the station concerned to the SW state supplied from OSC processor/controller 57, and writes the added SW state into the SW state in OSC. OSC processor/controller 58 then sends this OSC signal to the neighboring downstream station N2 (step S32).

The same process as OSC processor/controllers 57, 58 in the downstream station N1 is also executed in the downstream stations N2–Nn−1 (step S33). In the OSC transmitted to downstream station Nn (receiving terminal station $1_2$), the preceding notification of switchover and the SW state covering the switches from OSW 21 in the upstream station to OSW 41 in the downstream station Nn−1 are included.

OSC processor/controller 19 provided in the downstream station Nn adds the state of OSW 22 of the station concerned to the received SW state included in OSC, and supplies the added SW state to RAMP 14. With this, RAMP 14 can select the ASE correction table corresponding to the given SW state, and the ASE correction factor in the selected ASE correction table.

After transmitting the preceding notification of switchover and the SW state, the upstream station sends a switchover trigger signal to the downstream stations N1 (step S2), and each the downstream station N1–Nn−1 successively transfer the switchover trigger signal to the neighboring downstream station (steps S34, S33). Finally, the downstream station Nn receives the switchover trigger signal.

In synchronization with transmission/reception of this trigger signal, the upstream station and the downstream station N1 switches OSW (steps S3, S4), and also, each optical amplifier in the downstream stations N1–Nn selects the corresponding ASE correction table and the ASE correction factor, and performs the ASE correction after the switchover using the selected ASE correction factor (steps S36–S38).

Here, while this switchover is in execution, the downstream station N1 performs the dummy light transmission processing described earlier.

When the switchover is performed in the other transmission lines, the process similar to the above is performed.

According to this third method, the ASE correction factor is determined in advance, and by selecting this ASE correction factor, the ASE correction after the switchover can be performed. Accordingly, the calculation time to obtain ASE correction amount, etc. is not necessary at the time of switchover, and thus the processing time is reduced.

Additionally, in the ASE correction table, the ASE correction amount may be specified in place of the ASE correction factor. Or, the target level may be specified in this ASE correction table.

<Pre-Emphasis Control>

As described earlier, each attenuation factor (or attenuation amount when expressed by dB) of VAT 101–10*m* is adjusted by optical spectrum analyzer 15 in the sending terminal station 1, so as to control the signal quality (OSNR) of each wavelength (each channel) received in the receiving terminal station 1 to be uniform. Thus, pre-emphasis control is performed.

However, when the transmission line is switched and a wavelength dependent loss (WDL) of the transmission line and gain uniformity of the related optical amplifier are varied, the way of the tilt generation in the WDM optical signal may possibly be varied. This produces non-uniformity in the signal quality (OSNR) of each wavelength, and an error may occasionally be produced in a particular wavelength signal.

As a method for correcting this non-uniformity to be uniform, one method is to adjust a pre-emphasis amount. Namely, when the switchover is performed, the sending terminal station 1 performs the pre-emphasis control to readjust the attenuation factor (weight) of the signal level of each wavelength (each channel), so that the OSNR of each wavelength signal in the receiving terminal station 1 becomes uniform.

As to this pre-emphasis control, there are three methods described below.

(1) First Method of Pre-Emphasis Control

The first method of the pre-emphasis control is that peak power (peak level) of each reception channel signal after the switchover is measured in the receiving terminal station. Based on the measured peak level, a required increase or decrease of the attenuation factors of VAT in the sending terminal station is notified to the sending terminal station. The sending terminal station then readjusts the attenuation factor of VAT based on this notification.

Figure 14:
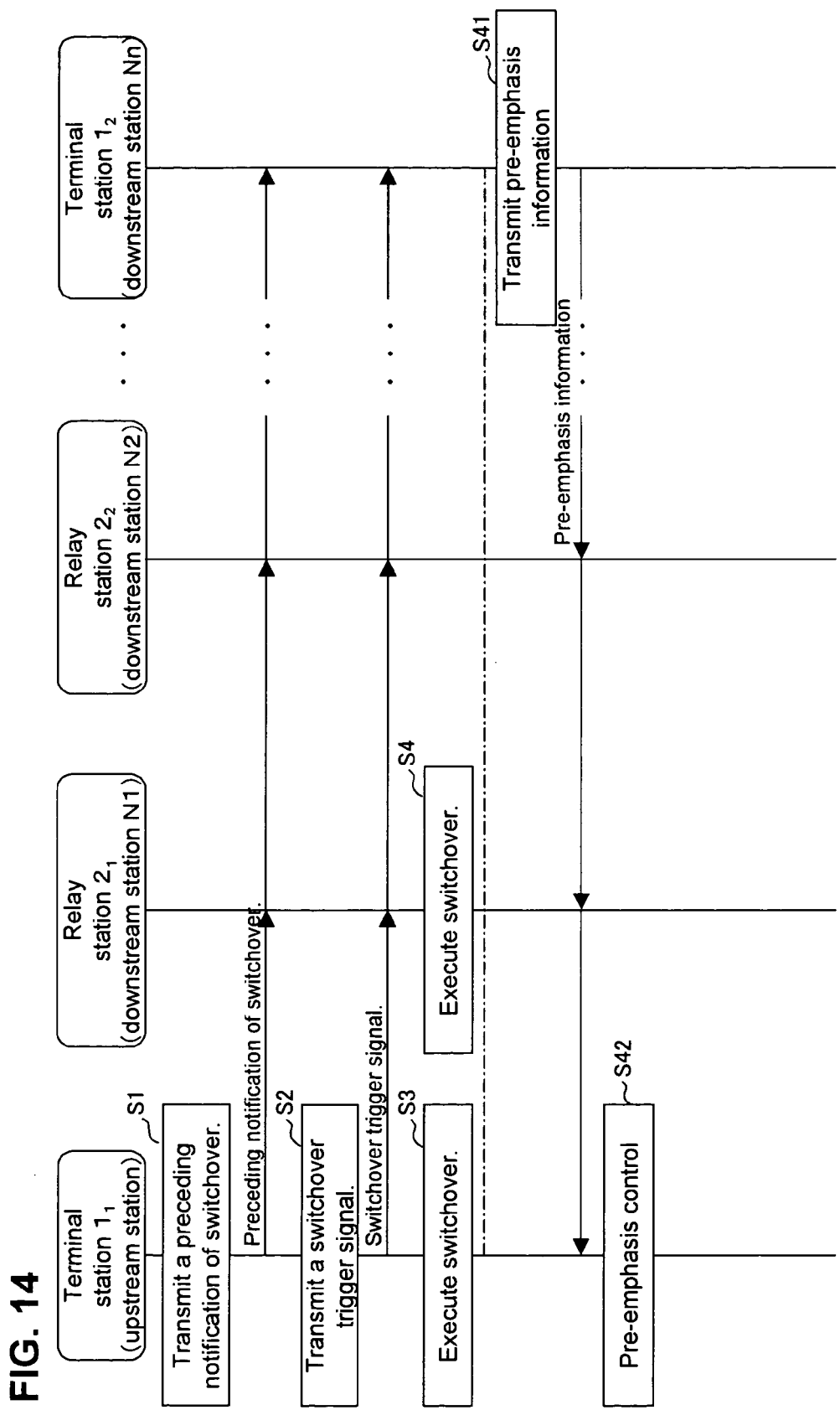
FIG. 14 shows a sequence diagram illustrating a processing flow of the first method of pre-emphasis control.

FIG. 14 shows a sequence diagram illustrating a processing flow of the first method of the pre-emphasis control. This sequence diagram exemplarily shows the processing performed when the transmission line in use between terminal station $1_1$ (upstream station) and relay station $2_1$ (downstream station N1) is switched from #0 system to #1 system. The same numerals are assigned for the same process as that shown in FIGS. 5, 7, etc., and the detailed description is omitted.

At the time of initiating this WDM optical communication system, optical spectrum analyzer 16 provided in the receiving terminal station $1_2$ (downstream station Nn) measures both OSNR and a peak level (peak power) of each channel in the reception signal (wavelengths λ1–λm), and supplies the OSNR and the peak level of each channel to OSC processor/controller 19. OSC processor/controller 19 stores the OSNR and the peak level supplied. Thereafter, when the number of channels (m) is varied, the OSNR and the peak level of each channel are also measured by optical spectrum analyzer 16, and stored in OSC processor/controller 19.

After that, when the transmission line between the upstream station and the downstream station N1 is to be switched from #0 system to #1 system, a preceding notification of switchover and a switchover trigger signal are successively transmitted from the upstream station to the downstream stations N1–Nn (step S1, S2). Thereafter, the upstream station and the downstream station N1 switch OSW. Here, at the time of the switchover, the aforementioned dummy light transmission process is performed, and after the switchover, the aforementioned ASE correction is executed.

After the switchover, optical spectrum analyzer 16 measures the peak level of each channel (each wavelength) and supplies this peak level to OSC processor/controller 19. In case that the notification of the ASE correction completion is sent, preferably, this peak level measurement is performed after the downstream station Nn receives the notification of the ASE correction completion.

OSC processor/controller 19 obtains a difference value between the peak level measured after switchover and the peak level stored at the time of the system initiation or the modification of the number of channels, on a channel-by-channel basis. OSC processor/controller 19 then writes this difference value into a pre-emphasis information field, and transmits to the upstream station (step S41).

OSC processor/controller 19 in the upstream station executes the pre-emphasis control based on the OSC signal transmitted from the downstream station Nn, so as to control optical spectrum analyzer 15 to modify each attenuation factor of VAT $10_1$–$10_m$ (step S42).

Namely, OSC processor/controller 19 increases the attenuation factor of VAT $10_i$, so that the output level of channel i is decreased by di, when the pre-emphasis information corresponding to channel i (i=1–m) has a difference value di (>0). On the other hand, when the difference value is –di (<0), OSC processor/controller 19 decreases the attenuation factor of VAT $10_i$, so that the output level of channel i is increased by di. Meanwhile, when the difference value equals to 0, the attenuation factor is not varied.

Such pre-emphasis control is based on the assumption that, the ASE component is constant, and as to a channel of which peak level (=signal component+ASE component) becomes greater than the peak level obtained at system initialization, etc., it is regarded that the OSNR becomes better, and, as to a channel of which peak level (=signal component+ASE component) becomes less than the peak level obtained at system initialization, etc., it is regarded that the OSNR becomes deteriorated. In such a way, by obtaining a difference value of the peak levels and performing the pre-emphasis control, signal quality can be restored within a shorter time, as compared to a pre-emphasis control method of making OSNR uniform after obtaining OSNR.

Execution of such feedback control produces the OSNR of each channel after the switchover to be substantially same as the OSNR having been adjusted at the time of the system initiation or the modification of the number of channels. As a result, it becomes possible to prevent deterioration of the optical signal reception quality resulting from the switchover of the transmission lines, and to prevent generation of a signal error.

Additionally, the similar processing is performed when such a switchover is performed on any other transmission lines.

(2) Second Method of Pre-Emphasis Control

The second method of the pre-emphasis control is that the sending terminal station 1 retains VAT attenuation factors corresponding to the OSW states of the stations from the sending terminal station 1 to the receiving terminal station 1, in the form of table (attenuation factor table), and after the switchover, the VAT attenuation factors are readjusted based on this table.

FIG. 16 shows an example of the attenuation factor table. This attenuation factor table specifies each attenuation factor of VAT $10_1$–VAT $10_m$ corresponding to each OSW state of the stations from the sending terminal station (in this case, terminal station $1_1$) to the receiving terminal station (in this case, terminal station $1_2$), as is similar to the ASE correction table shown in FIG. 13A. This attenuation factor table is retained in either optical spectrum analyzer 15 or OSC processor/controller 19. Each attenuation factor is obtained through experiments, system test operation, actual system operation, etc.

Figure 15:
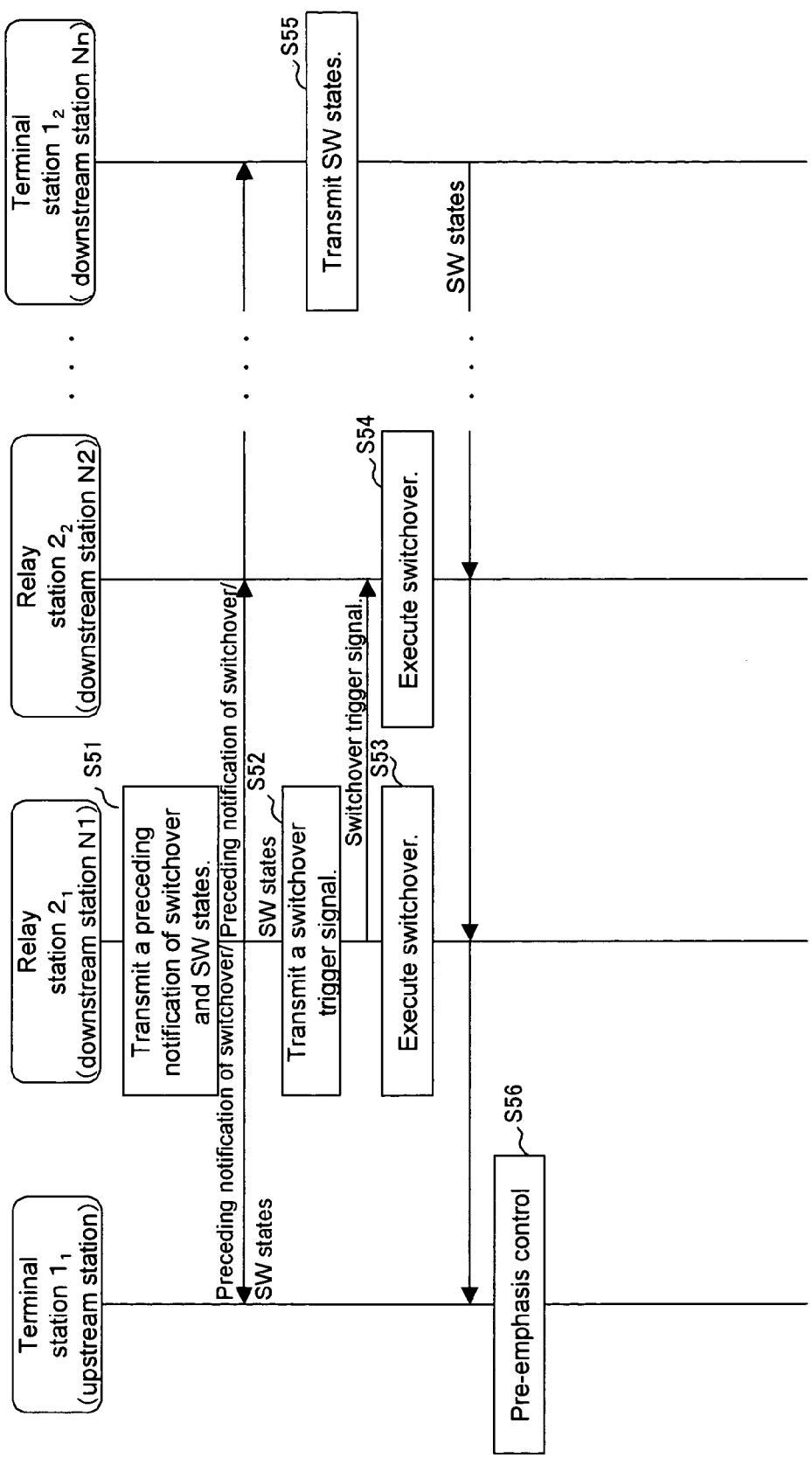
FIG. 15 shows a sequence diagram illustrating a processing flow of the second method of pre-emphasis control.

FIG. 15 shows a sequence diagram illustrating a processing flow of the second method of the pre-emphasis control. By way of example, FIG. 15 shows processing in case that the transmission line between the downstream station N1 (relay station $2_1$) and the downstream station N2 (relay station $2_2$) is switched over.

According to this second method, SW states are transmitted in a similar way to the aforementioned third method of the ASE correction. The SW states are transmitted to both directions, upstream from the downstream station N1 in which the transmission line is switched (i.e. to the upstream station), and downstream (i.e. to the downstream stations N2–Nn)(step S51).

The station having received the SW states transmitted upstream adds the own OSW state to the received SW states, and then transmits the added SW states further upstream. Finally, the SW states are transmitted to the sending terminal station (terminal station $1_1$ in FIG. 15) (step S51). Meanwhile, the station having received the SW states transmitted downstream also adds the own SW states to the received SW states, and then transmits the added SW states further downstream. Finally, the SW states are transmitted to the receiving terminal station (terminal station $1_2$ in FIG. 15) (step S51). The receiving terminal station adds the own OSW states to the SW states, and transmits the added SW states to the sending terminal station (step S55).

After the SW states (and the preceding notification of switchover) are transmitted, sending and receiving the switch over trigger signal (step S52) trigger the switchover (steps S53, S54).

The sending terminal station acquires the OSW states of the entire system by receiving and combining the SW states having been transmitted both upstream and downstream. Thus, the sending terminal station determines the attenuation factors of VAT $10_1$–$10_m$, corresponding to the OSW states of the entire system, and performs the pre-emphasis control (step S56). For example, in FIG. 16, when the SW states are {001100}, attenuation factors α13–αm3 are selected, and these attenuation factors are set into VAT $10_1$–$10_m$ by optical spectrum analyzer 15, respectively.

Here, in case that the notification of the ASE correction completion is transmitted to the sending terminal station, it may be possible for the sending terminal station to perform the pre-emphasis control on receipt of this ASE correction completion notification. Further, the similar processing is performed when such a switchover is performed on any other transmission lines.

According to this second method, since the attenuation factors are obtained using the attenuation factor table, the pre-emphasis control can be performed at high speed after the switchover. Further, this second method is effective when the OSNR of the reception channel signal cannot be measured constantly in the receiving terminal station.

(3) Third Method of Pre-Emphasis Control

The third method of the pre-emphasis control is that, the peak level of each channel, which is measured at system initialization or the modification of the number of channels in the aforementioned first method, is measured again immediately before the switchover.

Namely, in FIG. 14, on receipt of the preceding notification of switchover, downstream station Nn measures the peak level of each channel, and supplies this peak level to OSC processor/controller 19. OSC processor/controller 19 stores the supplied peak level.

Thereafter, when the switchover is performed, optical spectrum analyzer 16 measures the peak level of each channel (each wavelength) after the switchover, and supplies the measured peak level to OSC processor/controller 19. Incase that the notification of the ASE correction completion is transmitted, preferably, this measurement is performed after the downstream station Nn receives the notification of the ASE correction completion.

Thereafter, the steps S41 and S42 in the first method described earlier are performed.

According to this third method, it becomes also possible to avoid deterioration of the reception quality of the optical signal caused by the transmission line switchover.

Additionally, it may also be possible for optical spectrum analyzer 16 to measure the peak level of each channel at certain intervals (for example, 100 msec, 200 msec, or the like). With this, even when the switchover is performed without transmission of the preceding notification of switch over because of a sudden transmission line failure, the peak level of each channel before the switch over can be measured. Further, the similar processing is performed when such a switchover is performed on any other transmission lines.

<Connection by Use of Optical Fibers of Different Kinds>

A dispersion amount of an optical fiber increases in the order of DCF (dispersion compensation fiber), NZDSF (non-zero dispersion shift fiber), and SMF (single mode fiber). Therefore, in case NZDSF is used as transmission line, it is necessary to keep the optical signal level lower, being input to the NZDSF from either the sending terminal station 1 or relay station 2, than that being input to the SMF. Accordingly, in case that NZDSF is employed for one of the main transmission line and the backup transmission line, while SMF is employed for the other transmission line, and if both transmission lines produce substantially the same loss, then the levels to be output to the transmission lines are confined to the output level to the NZDSF transmission line, and when the transmission line is switched to the SMF transmission line, the output level thereto is maintained to the same level as before.

However, when the transmission lines are duplicated, one of the transmission lines (for example, backup transmission line) is, in many cases, an alternative route having a longer distance than the other. Under such a condition, when SMF is employed for the alternative route and NZDSF is employed for the other route, although the loss on the SMF side is larger, optical signals can be transmitted by increasing the output level of the SMF transmission line.

Figure 17:
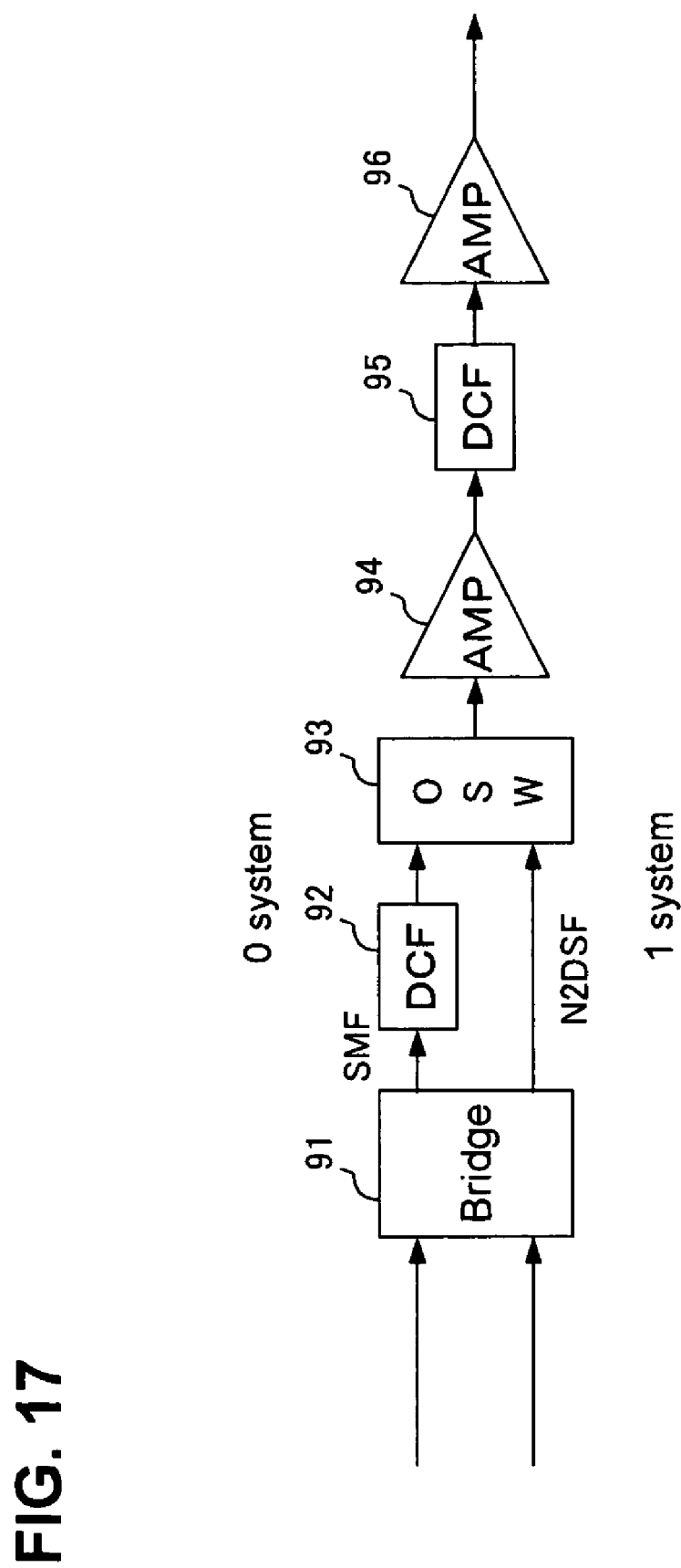
FIG. 17 shows a block diagram illustrating an exemplary system configuration when different kinds of optical fibers are used for transmission lines in #0 system and #1 system.
Figure 18:
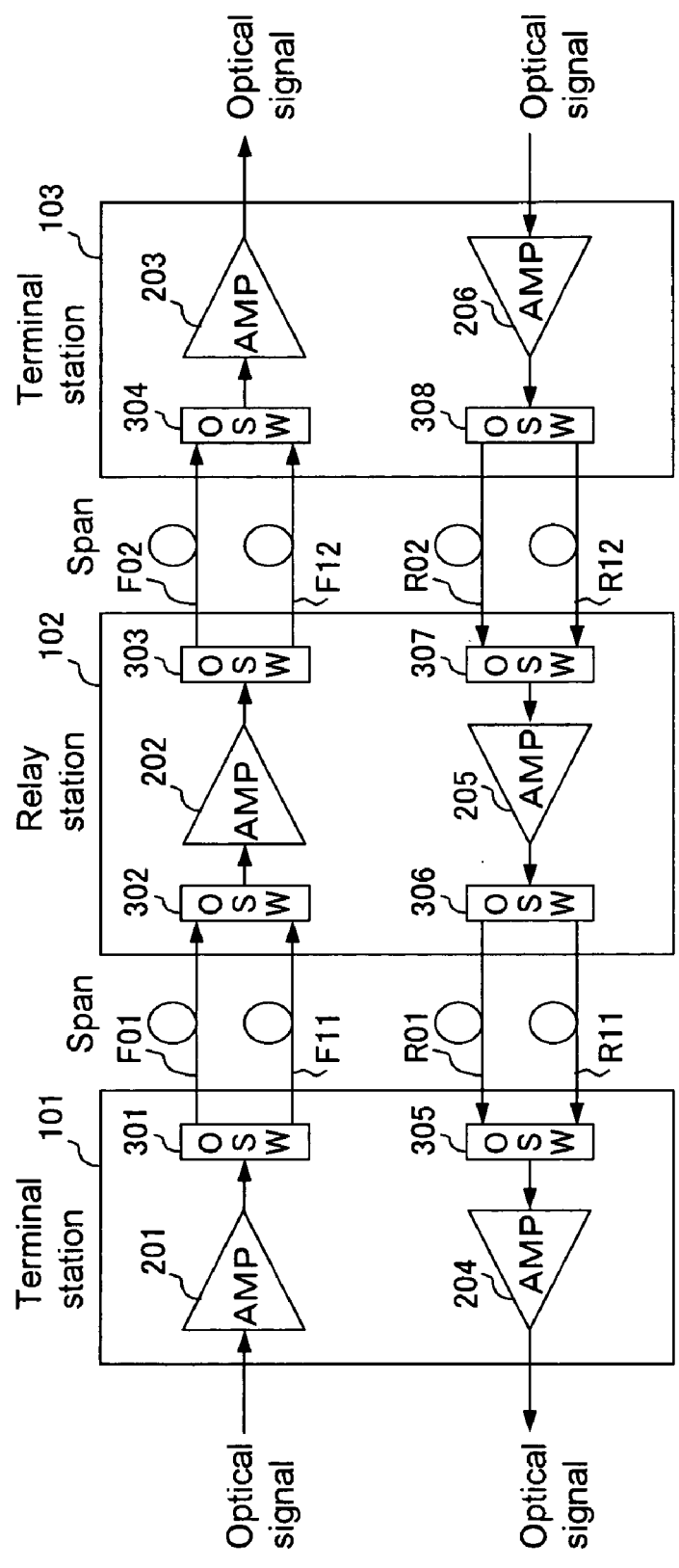
FIG. 18 shows a block diagram illustrating a schematic configuration example of a single-wavelength optical communication system having duplicated transmission lines.

As such, adjustment of the output level on the transmitting in compliance with the losses of #0 system and #1 system enables not only ASE correction but also the switchover between the fibers of different kinds. Further, because of dispersion amount of SMF different from that of NZDSF, such a configuration as shown in FIG. 17 is also possible.

More specifically, in case that SMF is employed for #0 system, and that NZDCF is employed for #1 system, a DCF 92 is disposed on the #0 system to compensate the difference in the dispersion amount between both fibers. Further, a DCF 95 is disposed on the output side of optical amplifier (AMP) 94 to compensate the dispersion amount of NZDSF.

The embodiment having been described above is illustrated in regard to the WDM optical communication system. However, the present invention (in particular, the invention with regard to the dummy light transmission processing and the ASE correction) is applicable to a single-wavelength optical communication system.

The above description is based on an optical communication system having relay station 2. However, the present invention is also applicable to a system having only a sending terminal station and a receiving terminal station, without any relay station 2, needless to say.

Further, in regard to the data included in the OSC signal (refer to FIG. 4), instead of multiplexing the data into a WDM optical signal for transmitting to relay station 2, terminal station 1, etc., it may also be possible to transmit to the relay station and the receiving station through a different line. For example, by providing central supervisory equipment separately from terminal station 1 and relay station 2, the data included in the OSC signal is transmitted to this central supervisory equipment, and then this data is transmitted from the central supervisory equipment to terminal station 1 and relay station 2.

INDUSTRIAL APPLICABILITY

The present invention is applicable to an optical communication system having plural sets of optical transmission equipment in which neighboring two optical transmission equipment sets are connected by the main transmission line and the backup transmission line, and optical signals is transmitted through one of the transmission lines, and optical transmission equipment (sending equipment (sending station)), relay equipment (relay station), receiving equipment (receiving station) in the optical communication system. In particular, the present invention is used for a WDM optical communication system and optical transmission equipment in the WDM optical communication system.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical transmission equipment in an optical communication system having plural sets of the optical transmission equipment of which neighboring two optical transmission equipment sets are interconnected by a main transmission line and a backup transmission line, and optical signals are transmitted on one of the optical transmission lines, said optical transmission equipment comprising:

an optical amplifier amplifying optical signal inputs from one transmission line in use for optical signal transmission out of the main transmission line and the backup transmission line respectively interconnecting the optical transmission equipment concerned with neighboring upstream optical transmission equipment, and outputting optical signals including a signal component and a noise component; and a controller controlling an optical signal level of output from the optical amplifier so that the signal component in the optical signal output from the optical amplifier reaches a predetermined level, and wherein the controller corrects the optical signal level of output from the optical amplifier when the transmission line transmitting the optical signal is switched either from the main transmission line to the backup transmission line or from the backup transmission line to the main transmission line, either between the optical transmission equipment concerned and the neighboring upstream optical transmission equipment, or between other two optical transmission equipment sets located on the upstream side, the controller performs correction based on a first noise component included in the optical signal being input to the optical amplifier and a second noise component generated by the optical amplifier concerned, and the controller performs the correction so that the optical signal level being output from the optical amplifier reaches a sum of a post-amplification level of the first noise component amplified by the optical amplifier, the second noise component level, and the predetermined signal component level.

2. The optical transmission equipment according to claim 1, wherein the information of the post-amplification level of the first noise component is supplied from the neighboring upstream optical transmission equipment, and said level is a power value of the first noise component, a power value of the optical signal output from the optical amplifier, a value calculated from the ratio of the noise component to the optical signal output from the optical amplifier, or a value calculated from of the signal component to the optical signal output from the optical amplifier.

3. The optical transmission equipment according to claim 1, wherein the controller supplies, to the neighboring downstream optical transmission equipment, data for use in the correction performed by the neighboring downstream optical transmission equipment.

4. The optical transmission equipment according to claim 3, wherein the data for use in the correction is the power value of the noise component of the optical output signal from the optical amplifier, the power value of the signal component of the output optical signal from the optical amplifier, or, either the ratio of the noise or signal component in the output optical signal of the optical amplifier.

5. An optical transmission equipment in an optical communication system having plural sets of the optical transmission equipment of which neighboring two optical transmission equipment sets are interconnected by a main transmission line and a backup transmission line, and optical signals are transmitted on one of the optical transmission lines, said optical transmission equipment comprising:

an optical amplifier amplifying optical signal inputs from one transmission line in use for optical signal transmission out of the main transmission line and the backup transmission line respectively interconnecting the optical transmission equipment concerned with neighboring upstream optical transmission equipment, and outputting optical signals including a signal component and a noise component; and a controller controlling an optical signal level of output from the optical amplifier so that the signal component in the optical signal output from the optical amplifier reaches a predetermined level, and wherein the controller corrects the optical signal level of output from the optical amplifier when the transmission line transmitting the optical signal is switched either from the main transmission line to the backup transmission line or from the backup transmission line to the main transmission line, either between the optical transmission equipment concerned and the neighboring upstream optical transmission equipment, or between other two optical transmission equipment sets located on the upstream side, the controller retains in advance correction data for the correction, and performs the correction based on the retained the correction data, and the correction data is a correction value of the optical signal level of output from the optical amplifier corresponding to the combinations of transmission line states, each indicating which of the main transmission line and the backup transmission line is in use for the optical signal transmission, with respect to the transmission line on which a switchover has been performed and each transmission line located on the downstream side therefrom to the optical transmission equipment concerned.

6. The optical transmission equipment according to claim 5, wherein the combinations of the transmission line states are successively transmitted from the optical transmission equipment being connected to the transmission line on which the switchover has been performed to optical transmission equipment sets located on the downstream side, and each optical transmission equipment, on receipt of the combinations of the transmission line states, transmits to neighboring downstream optical transmission equipment a transmission line state connected to the optical transmission equipment concerned in addition to the received combinations of the transmission line states.

7. The optical transmission equipment according to claim 5, wherein the correction value is a ratio of the signal component to a predetermined level, or a power value of the noise component included in the optical signal output from the optical amplifier.

8. An optical communication system having a sending terminal station, one or more relay stations, and a receiving terminal station, transmitting optical signals from the sending terminal station to the receiving terminal station through the relay stations, wherein the sending terminal station sends optical signals to the neighboring downstream relay station connected with a main transmission line or a backup transmission line, and each relay station comprises:

an optical amplifier amplifying the optical signal input from the main transmission line or the backup transmission line connected to the neighboring sending terminal station or the other neighboring upstream relay station, and outputting optical signals including a signal component and a noise component; and a controller controlling the optical signal level of output from the optical amplifier so that the signal component included in the optical signal output from the optical amplifier reaches a predetermined level, and the receiving terminal station comprises:

an optical amplifier amplifying the optical signal input from one transmission line in use for optical signal transmission, out of the main transmission line and the backup transmission line connected to the neighboring upstream relay-station, and outputting optical signals including the signal component and the noise component; and a controller controlling the optical signal level of output from the optical amplifier so that the signal component included in the optical signal output from the optical amplifier reaches a predetermined level, and the controller provided in the relay station and the receiving terminal station corrects the optical signal level of output from each own optical amplifier when the transmission line transmitting the optical signal is switched either from the main transmission line to the backup transmission line or from the backup transmission line to the main transmission line, either between the optical transmission equipment concerned and the neighboring upstream optical transmission equipment, or between other two optical transmission equipment sets on the upstream side.

9. An optical transmission equipment in an optical communication system having plural sets of the optical transmission equipment of which each neighboring optical transmission equipment set is interconnected by a main transmission line and a backup transmission line, comprising:
- an optical amplifier amplifying optical signal inputs from one transmission line in use for optical signal transmission out of the main transmission line and the backup transmission line interconnecting the optical transmission equipment concerned with the neighboring upstream optical transmission equipment, and outputting optical signals including a signal component and a noise component;
- a controller controlling an optical signal level of output from the optical amplifier so that the signal component included in the optical signal output from the optical amplifier reaches a predetermined level; and
- a transmitter transmitting, to the neighboring upstream optical transmission equipment, correction data for correcting an output level of an optical amplifier in the neighboring upstream optical transmission equipment, and
- wherein the controller performs the correction based on a first noise component included in the optical signal being input to the optical amplifier and a second noise component generated by the optical amplifier concerned, and
- the controller performs the correction so that the optical signal level being output from the optical amplifier reaches a sum of a post-amplification level of the first noise component amplified by the optical amplifier, the second noise component level, and the predetermined signal component level.

10. The optical transmission equipment according to claim 9,
- wherein the correction data is a ratio of an input level of the optical amplifier before a switchover to the input level of the optical amplifier after a switchover.

11. An Optical transmission equipment in an optical communication system having plural sets of the optical transmission equipment of which each neighboring optical transmission equipment set is interconnected by a main transmission line and a backup transmission line, said optical transmission equipment comprising:
- an optical amplifier amplifying input optical signals, and outputting optical signals after the amplification to the neighboring downstream optical transmission equipment through one of the main transmission line and the backup transmission line being connected to both the optical transmission equipment concerned and the neighboring downstream optical transmission equipment; and
- a controller controlling an optical signal level of output from the optical amplifier so that a signal component included in the optical signal output from the optical amplifier reaches a predetermined level,
- wherein, when the transmission line outputting the optical signal is switched either from the main transmission line to the backup transmission line or from the backup transmission line to the main transmission line, the controller corrects the optical signal level of output from the optical amplifier based on correction data transmitted from the neighboring downstream optical transmission equipment, and
- wherein the controller performs the correction based on a first noise component included in the optical signal being input to the optical amplifier and a second noise component generated by the optical amplifier concerned, and
- the controller performs the correction so that the optical signal level being output from the optical amplifier reaches a sum of a post-amplification level of the first noise component amplified by the optical amplifier, the second noise component level, and the predetermined signal component level.

12. The optical transmission equipment according to claim 11,
- wherein correction data is a ratio of a level of the optical signal input to the neighboring downstream optical transmission equipment before a switchover to a level of the optical signal after the switchover, and
- the controller corrects the optical signal level of output from the optical amplifier by multiplying the reciprocal of the ratio.

* * * * *